United States Patent
Shirai et al.

(10) Patent No.: US 11,202,001 B2
(45) Date of Patent: Dec. 14, 2021

(54) IMAGE STABILIZATION APPARATUS AND METHOD, AND IMAGE CAPTURING APPARATUS

(71) Applicant: CANON KABUSHIKI KAISHA, Tokyo (JP)

(72) Inventors: Kunihiro Shirai, Yokohama (JP); Akira Kano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 16/680,835

(22) Filed: Nov. 12, 2019

(65) Prior Publication Data

US 2020/0162669 A1 May 21, 2020

(30) Foreign Application Priority Data

Nov. 15, 2018 (JP) .............................. JP2018-214850
Oct. 9, 2019 (JP) .............................. JP2019-186261

(51) Int. Cl.
*H04N 5/232* (2006.01)

(52) U.S. Cl.
CPC ..... *H04N 5/23229* (2013.01); *H04N 5/23287* (2013.01)

(58) Field of Classification Search
CPC ........... H04N 5/23229; H04N 5/23287; H04N 5/23258; H04N 5/3572; H04N 5/23264; H04N 9/04517
See application file for complete search history.

(56) References Cited

U.S. PATENT DOCUMENTS

| 2007/0097219 A1* | 5/2007 | Nomura ............ H04N 5/23258 348/208.7 |
| 2009/0297060 A1* | 12/2009 | Hattori ................ H04N 5/2628 382/275 |
| 2011/0128406 A1* | 6/2011 | Shirai .................. H04N 5/3572 348/223.1 |
| 2014/0176755 A1* | 6/2014 | Narita ................ H04N 5/23258 348/222.1 |
| 2019/0230287 A1* | 7/2019 | Shingu ............... H04N 5/23258 |
| 2020/0036899 A1* | 1/2020 | Tanaka ............... H04N 5/23287 |

FOREIGN PATENT DOCUMENTS

| JP | 4195950 B | 12/2008 |
| JP | 5979837 B | 8/2016 |

* cited by examiner

*Primary Examiner* — Nhan T Tran
(74) *Attorney, Agent, or Firm* — Cowan, Liebowitz & Latman, P.C.

(57) ABSTRACT

An image stabilization apparatus comprising: a calculator that calculates a drive amount for correcting blur by moving a position of an image sensor, that photoelectrically converts light incident through an optical system and outputs an image signal, on a plane perpendicular to an optical axis of the optical system in accordance with a detected blur amount; and calculates, for each of a plurality of states of the optical system and a plurality of states of an image capturing apparatus, an allowable drive amount of the image sensor corresponding to optical characteristics information and a state of the optical system and a state of the image sensor. The calculator calculates the drive amount within the allowable drive amount.

15 Claims, 20 Drawing Sheets

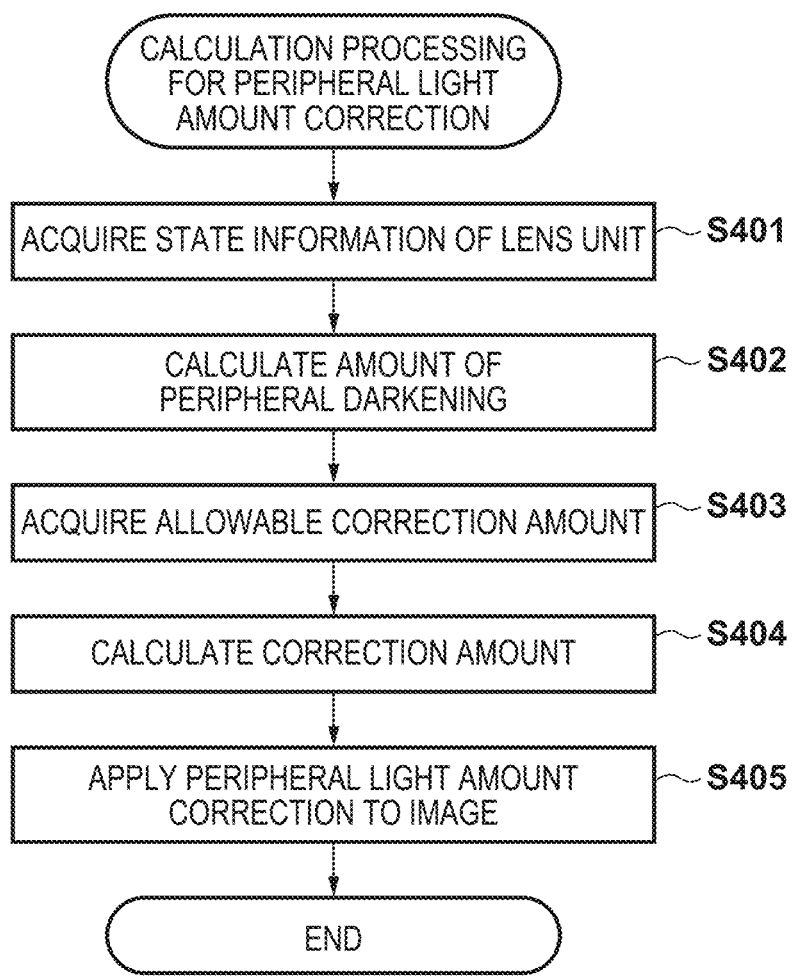

FIG. 9

| ISO0 | Iris0 | Focus0 | Zoom0 | Data[0][0][0][0] |
| | | | Zoom1 | Data[0][0][0][1] |
| | | | ... | |
| | | Focus1 | ... | |
| | | ... | | |
| | Iris1 | ... | | |
| | ... | | | |
| ISO1 | ... | | | |
| ... | | | | |

F I G. 17A
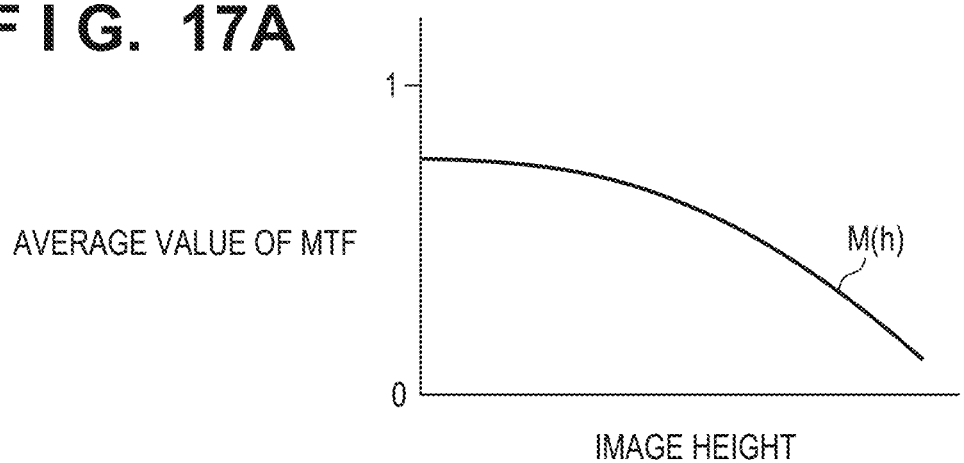
F I G. 17B
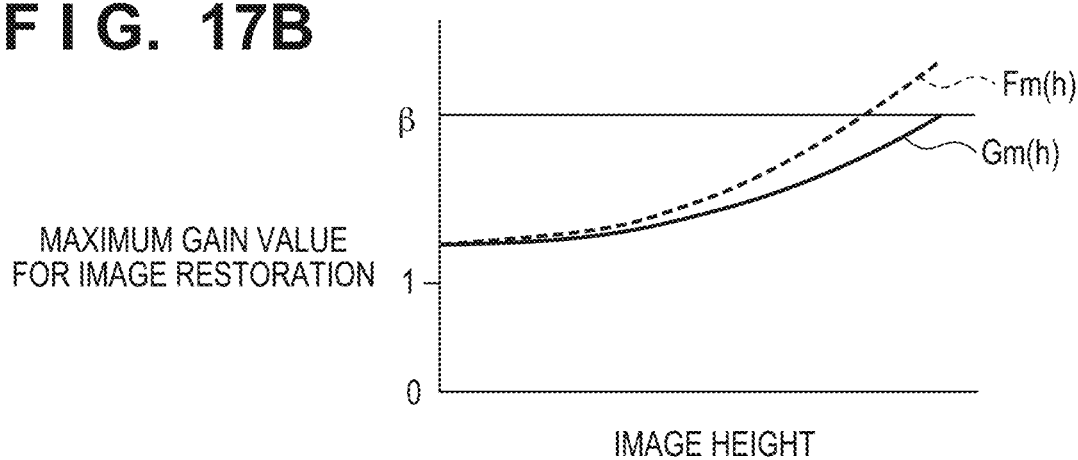
F I G. 17C
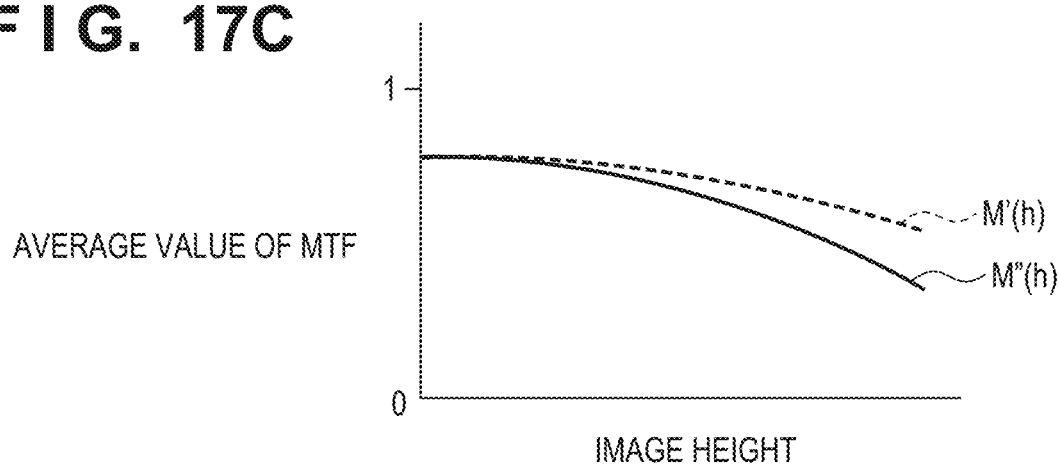

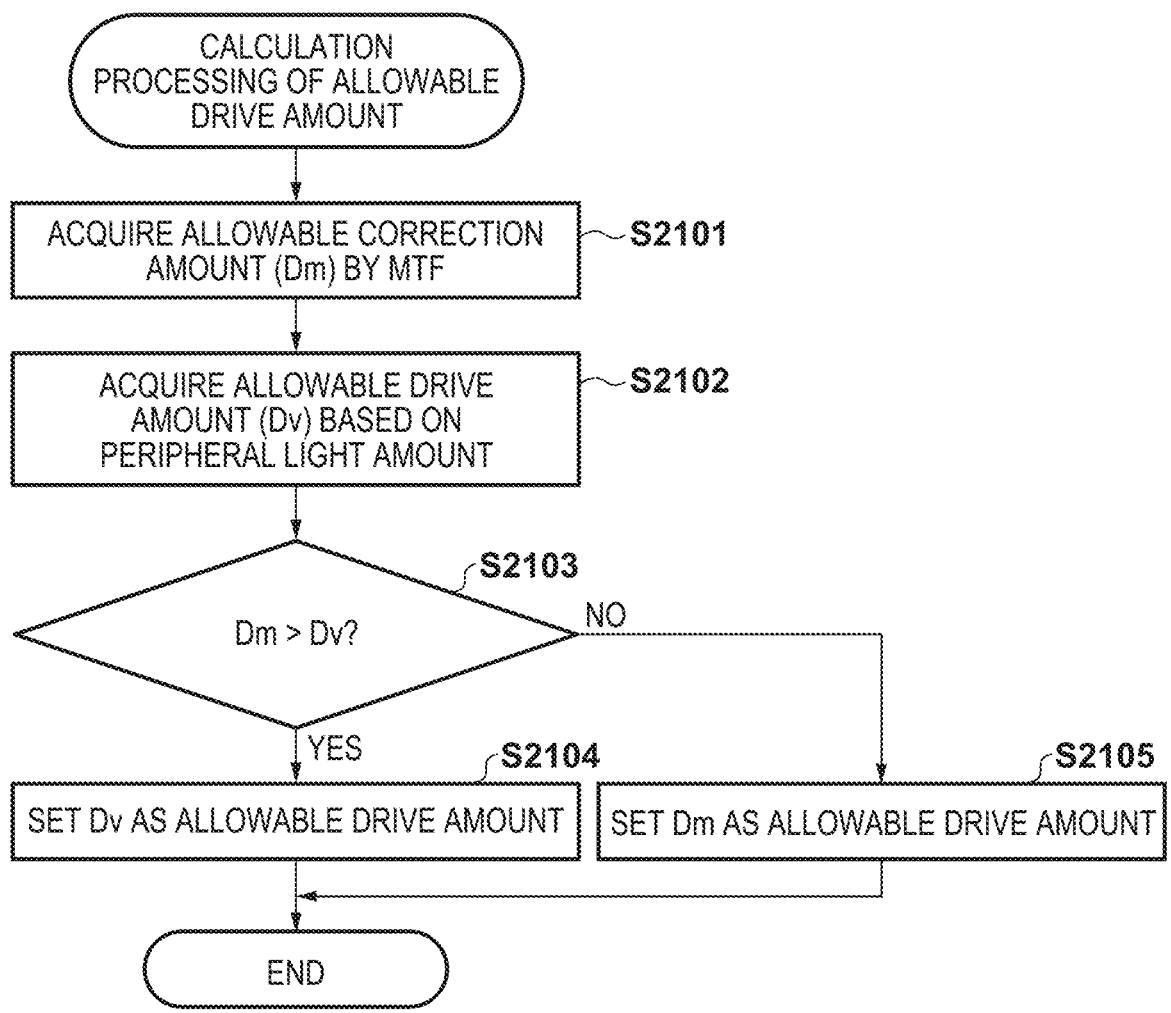

IMAGE STABILIZATION APPARATUS AND METHOD, AND IMAGE CAPTURING APPARATUS

BACKGROUND OF THE INVENTION

Field of the Invention

The present invention relates to an image stabilization apparatus and method that corrects blurring during shooting, and an image capturing apparatus, and more particularly to an image stabilization apparatus and method that drives an image sensor to obtain an image stabilization effect, and an image capturing apparatus.

Description of the Related Art

In recent years, image stabilization mechanisms have been mounted on many image capturing apparatuses and imaging lenses as the performance of image capturing apparatuses improves. Conventionally, correction of so-called pitch (rotation along an axis extending in the lateral direction of an image capturing apparatus) and yaw (rotation along an axis extending in the vertical direction of an image capturing apparatus), which are shakes having a greater influence on images among other shakes, has been performed. However, as the performance of image stabilization for pitch and yaw has improved, an influence of roll (rotation around the optical axis) cannot be ignored. Accordingly, many mechanisms capable of correcting shakes including roll have been proposed. As mechanisms capable of correcting roll, many mechanisms for correcting shake by driving an image sensor in accordance with a shake amount of the image capturing apparatus have been proposed.

On the other hand, if the drive amount of the image sensor is excessively increased for correcting the shakes, there is a possibility that a captured image is adversely affected. The reasons of the adverse effects include a decrease in light amount (brightness) due to optical characteristics of a lens and a decrease in resolution.

Japanese Patent No. 4195950 discloses an image capturing apparatus that includes a motion correction unit that corrects a motion of a captured image caused by a motion of an image capturing apparatus, in which a luminance signal acquired from an image sensor is divided into a plurality of regions, and a degree of uniformity is determined for each region. If the degree of uniformity is lower than a predetermined value, the motion correction is limited. As a result, it is possible to suppress the degrees of uniformity of the four corners of the shot signal to a predetermined amount.

Japanese Patent No. 5979837 discloses an interchangeable lens that can be attached to and detached from an image capturing apparatus, in which the movable range of a shake correction lens is changed depending on whether or not the attached image capturing apparatus has a function of correcting peripheral light amount or aberration. As a result, more accurate shake correction can be performed in a case where the image capturing apparatus to which the interchangeable lens is mounted has a peripheral light amount correction function.

However, even if the image stabilization apparatuses disclosed in Japanese Patent No. 4195950 and No. 5979837 are used, image quality deterioration due to the decrease in light amount caused by shake correction cannot be sufficiently avoided.

In the image stabilization apparatus disclosed in Japanese Patent No. 4195950, the luminance signal is detected from a captured signal, and the degrees of uniformity of brightness at the four corners are determined. Therefore, there is a drawback that it is difficult to determine whether non-uniformity of brightness between the four corners occurs due to shake correction or due to the subject. Further, since the determination is performed using the shot signal, there is a high possibility that a state in which the uniformity of the four corners is not in a desired state may temporarily occur. In addition, in the image stabilizing lens device disclosed in Japanese Patent No. 5979837, since the movable range is changed depending on the presence or absence of the correction function in the image capturing apparatus to which the image stabilizing lens device is mounted, there's a problem that a control to compensate for the brightness of an output image is not performed.

Further, the non-uniformity at the four corners is caused not only by the brightness due to the peripheral light amount, but also by image quality deterioration at mainly peripheral portions due to aberrations such as coma and sagittal halo. Thus, when the drive amount of the shake correction mechanism is excessively large, there is a problem that the image quality deterioration at the periphery of an image due to the blur caused by the aberration and non-uniformity of resolution at the four corners occur.

SUMMARY OF THE INVENTION

The present invention has been made in consideration of the above situation, and in an image capturing apparatus with an interchangeable lens system, an effect of image stabilization is maximized while ensuring an image quality at peripheral portions depending on a combination of a lens and the image capturing apparatus.

According to the present invention, provided is an image stabilization apparatus comprising: a calculator that calculates a drive amount for correcting blur by moving a position of an image sensor, that photoelectrically converts light incident through an optical system and outputs an image signal, on a plane perpendicular to an optical axis of the optical system in accordance with a detected blur amount; and calculates, for each of a plurality of states of the optical system and a plurality of states of an image capturing apparatus, an allowable drive amount of the image sensor corresponding to optical characteristics information and a state of the optical system and a state of the image sensor, wherein the calculator calculates the drive amount within the allowable drive amount.

Further, according to the present invention, provided is an image capturing apparatus comprising: an image sensor; an image stabilization apparatus which comprises a calculator that calculates a drive amount for correcting blur by moving a position of the image sensor, that photoelectrically converts light incident through an optical system and outputs an image signal, on a plane perpendicular to an optical axis of the optical system in accordance with a detected blur amount, calculates, for each of a plurality of states of the optical system and a plurality of states of the image capturing apparatus, an allowable drive amount of the image sensor corresponding to optical characteristics information and a state of the optical system and a state of the image sensor; and an image stabilization mechanism that moves a position of the image sensor on a plane perpendicular to the optical axis of the optical system based on the drive amount calculated by the calculator, wherein the calculator calculates the drive amount within the allowable drive amount.

Furthermore, according to the present invention, provided is an image stabilization method comprising: calculating a drive amount for correcting blur by moving a position of an image sensor that photoelectrically converts light incident through an optical system and outputs an image signals on a plane perpendicular to an optical axis of the optical system in accordance with a detected blur amount; and calculating, for each of a plurality of states of the optical system and a plurality of states of an image capturing apparatus, an allowable drive amount of the image sensor corresponding to optical characteristics information and a state of the optical system and a state of the image sensor, wherein the drive amount is obtained within the allowable drive amount.

Further, according to the present invention, provided is a non-transitory storage medium readable by a computer, the storage medium storing a program that is executable by the computer, wherein the program includes program code for causing the computer to function as an image stabilization apparatus comprising: a calculator that calculates a drive amount for correcting blur by moving a position of an image sensor, that photoelectrically converts light incident through an optical system and outputs an image signal, on a plane perpendicular to an optical axis of the optical system in accordance with a detected blur amount; and calculates, for each of a plurality of states of the optical system and a plurality of states of an image capturing apparatus, an allowable drive amount of the image sensor corresponding to optical characteristics information and a state of the optical system and a state of the image sensor, wherein the calculator calculates the drive amount within the allowable drive amount.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a flowchart showing correction processing for peripheral light amount correction according to the embodiment:

FIG. 9 is a diagram illustrating an example of an image stabilization drive table according to the first embodiment:

FIGS. 17A to 17C are diagrams for explaining a correction amount for image restoration according to the fifth embodiment;

FIG. 20 is a diagram illustrating an example of an image stabilization drive table according to the fifth embodiment;

FIG. 21 is a flowchart illustrating calculation processing of an allowable drive amount of an image sensor according to the fifth embodiment.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1A:
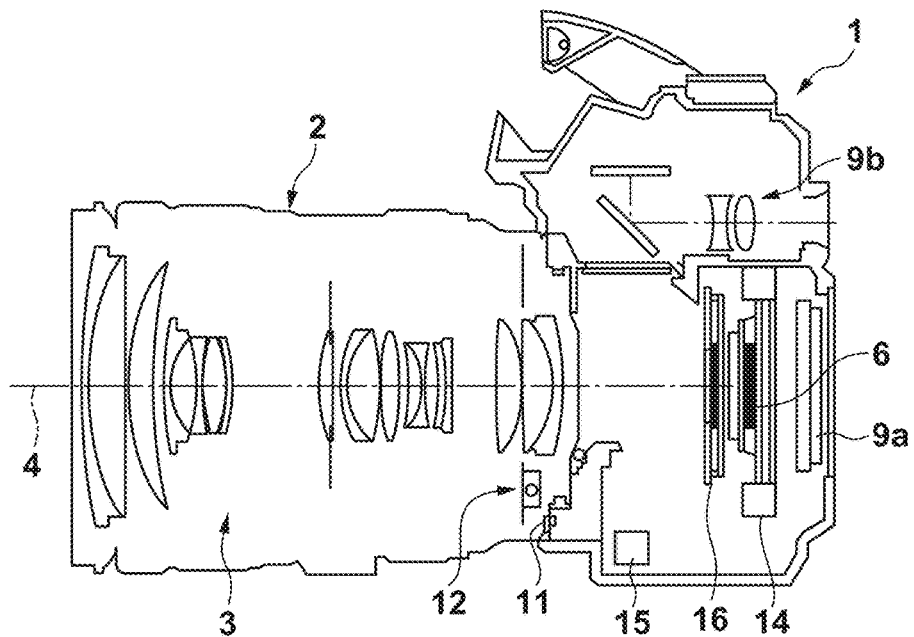
FIGS. 1A and 1B are a central sectional view and a block diagram showing a schematic configuration of an image capturing system according to an embodiment of the present invention.

First, an imaging system used in the present embodiment will be described. FIG. 1A is a central sectional view of an image capturing system according to an embodiment of the present invention, and FIG. 1B is a block diagram showing a schematic configuration of the image capturing system.

As shown in FIG. 1A, the image capturing system of the present invention includes an image capturing apparatus main body 1 and a lens unit 2 attached to the image capturing apparatus main body 1. The lens unit 2 includes an imaging optical system 3 comprised of a plurality of lenses and a lens system control circuit 12. A dot-dash line 4 indicates an optical axis of the imaging optical system 3. The image capturing apparatus main body 1 includes an image sensor 6, a rear display 9a, an electric view finder (EVF) 9b, an image stabilization unit 14, a shake detection unit 15, and a shutter mechanism 16. The image capturing apparatus main body 1 and the lens unit 2 are connected via an electrical contact 11 so as to be communicable with each other.

Figure 1B:
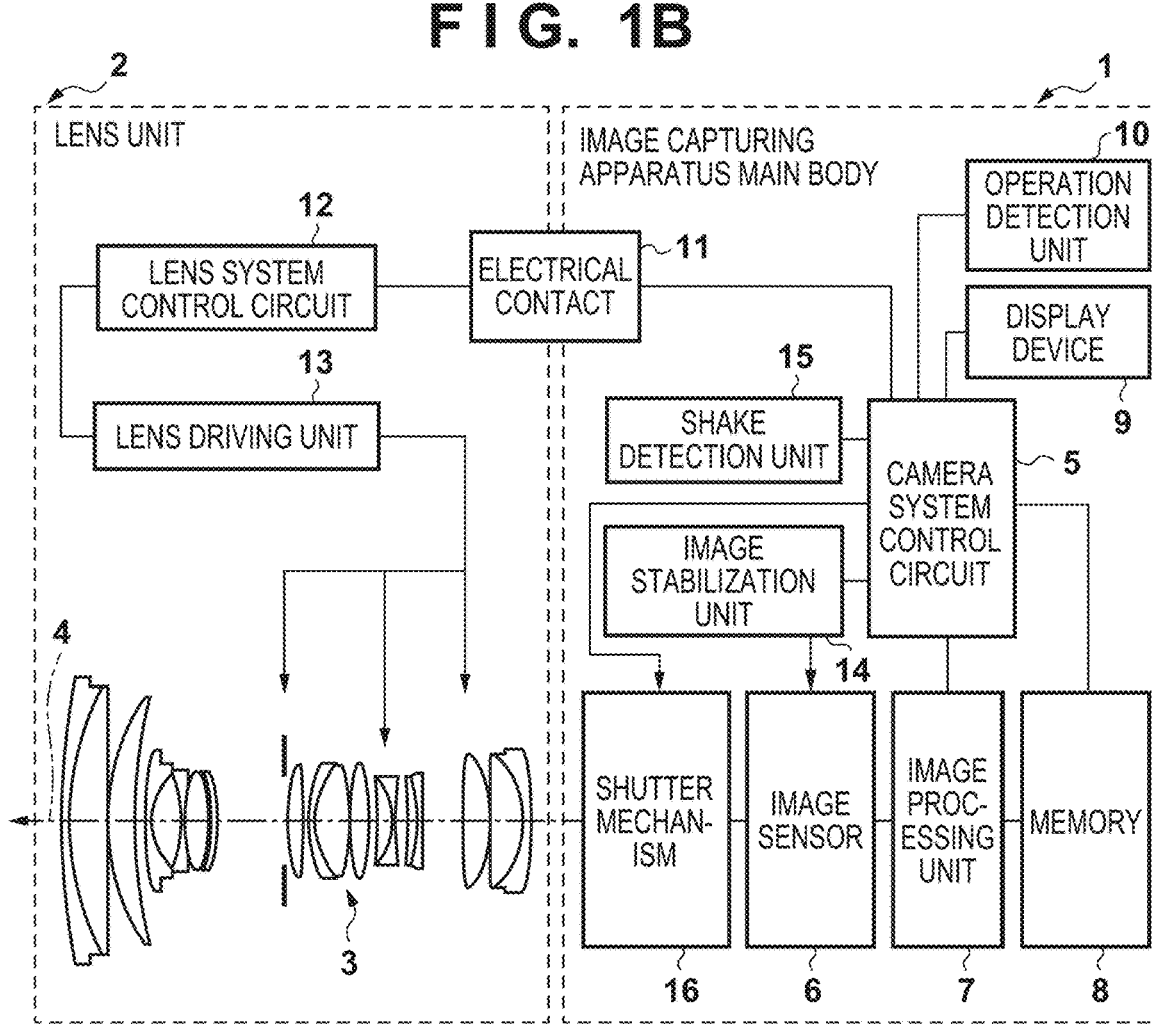

FIG. 1B is a block diagram showing an electrical configuration of the image capturing apparatus main body 1. The camera system in the present embodiment includes an imaging system, an image processing system, a recording/playback system, and a control system. The imaging system includes the imaging optical system 3, the image sensor 6, and the shutter mechanism 16, and the image processing system includes an image processing unit 7. The recording/playback system includes a memory 8 and a display device 9 including a rear display 9a and an EVF 9b. The control system includes a camera system control circuit 5, an operation detection unit 10, the lens system control circuit 12, a lens driving unit 13, the image stabilization unit 14, and the shake detection unit 15.

The lens driving unit 13 can drive a focus lens, an image stabilization lens, a diaphragm, and the like. The shake detection unit 15 can detect rotational shake of the apparatus including rotation around the optical axis 4, and a vibration gyro or the like can be used. The image stabilization unit 14 is a mechanism that translates the image sensor 6 in a plane orthogonal to the optical axis 4 and rotates the image sensor 6 around the optical axis 4, and a specific structure thereof will be described later.

The imaging system forms an image of light from a subject on an imaging surface of the image sensor 6 via the imaging optical system 3. Since information for a focus evaluation amount and an appropriate exposure amount can be obtained from the image sensor 6, the imaging optical system 3 is appropriately adjusted based on this information so that an appropriate amount of light from the subject is incident on the image sensor 6 and a subject image is formed near the image sensor 6. The image sensor 6 photoelectrically converts the subject image and outputs an image signal.

The image processing unit 7 includes an A/D converter, a white balance adjustment circuit, a gamma correction circuit, an interpolation calculation circuit, and the like, and generates an image for recording based on the image signal input from the image sensor 6. A color interpolation processing circuit is also provided in the image processing unit 7, and performs color interpolation (demosaicing) processing on the image signal of Bayer array to generate a color image. The image processing unit 7 also compresses images, moving images, sounds, and the like using a predetermined method.

The camera system control circuit 5 performs output to the memory 8 and displays an image to be presented to the user on the display device 9.

The camera system control circuit 5 generates and outputs a timing signal at the time of shooting, and controls the imaging system, the image processing system, and the recording/playback system in response to an external operation. For example, when the operation detection unit 10 detects pressing of a shutter release button (not shown), the camera system control circuit 5 controls driving of the image sensor 6, operation of the image processing unit 7, compression processing, and the like. Further, the camera system control circuit 5 controls the state of each segment of the information display device that displays information by the display device 9. The rear display 9a is a touch panel and is connected to the operation detection unit 10.

Here, the adjustment operation of the optical system by the control system will be described. An image processing unit 7 is connected to the camera system control circuit 5, and an appropriate focus position and aperture value are obtained based on the signal from the image sensor 6. That is, the camera system control circuit 5 performs a photometry/focus detection operation based on the signal from the image sensor 6, and determines an exposure condition (F number, shutter speed, etc.).

The camera system control circuit 5 issues a command to the lens system control circuit 12 via the electrical contact 11, and the lens system control circuit 12 controls the lens driving unit 13 based on the command. Further, in the mode for performing image stabilization, the image stabilization lens included in the imaging optical system 3 is appropriately controlled via the lens driving unit 13 based on a signal, which will be described later, obtained from the image sensor 6.

As described above, by controlling the operation of each part of the image capturing apparatus main body 1 in response to a user operation on the operation detection unit 10, still images and moving images can be shot.

In controlling the image stabilization unit 14 in the image capturing apparatus main body 1, the image stabilization unit 14 is operated based on the signal from the shake detection unit 15. The camera system control circuit 5 is responsible for generating a target value for image stabilization based on a detected signal from the shake detection unit 15 and for driving control of the image stabilization unit 14. Similarly, the camera system control circuit 5 is also responsible for reducing the rotation around the optical axis 4 according to the shooting conditions. The image stabilization unit 14 drives the image sensor 6 on a plane perpendicular to the optical axis 4 under control of the camera system control circuit 5.

Figure 2:
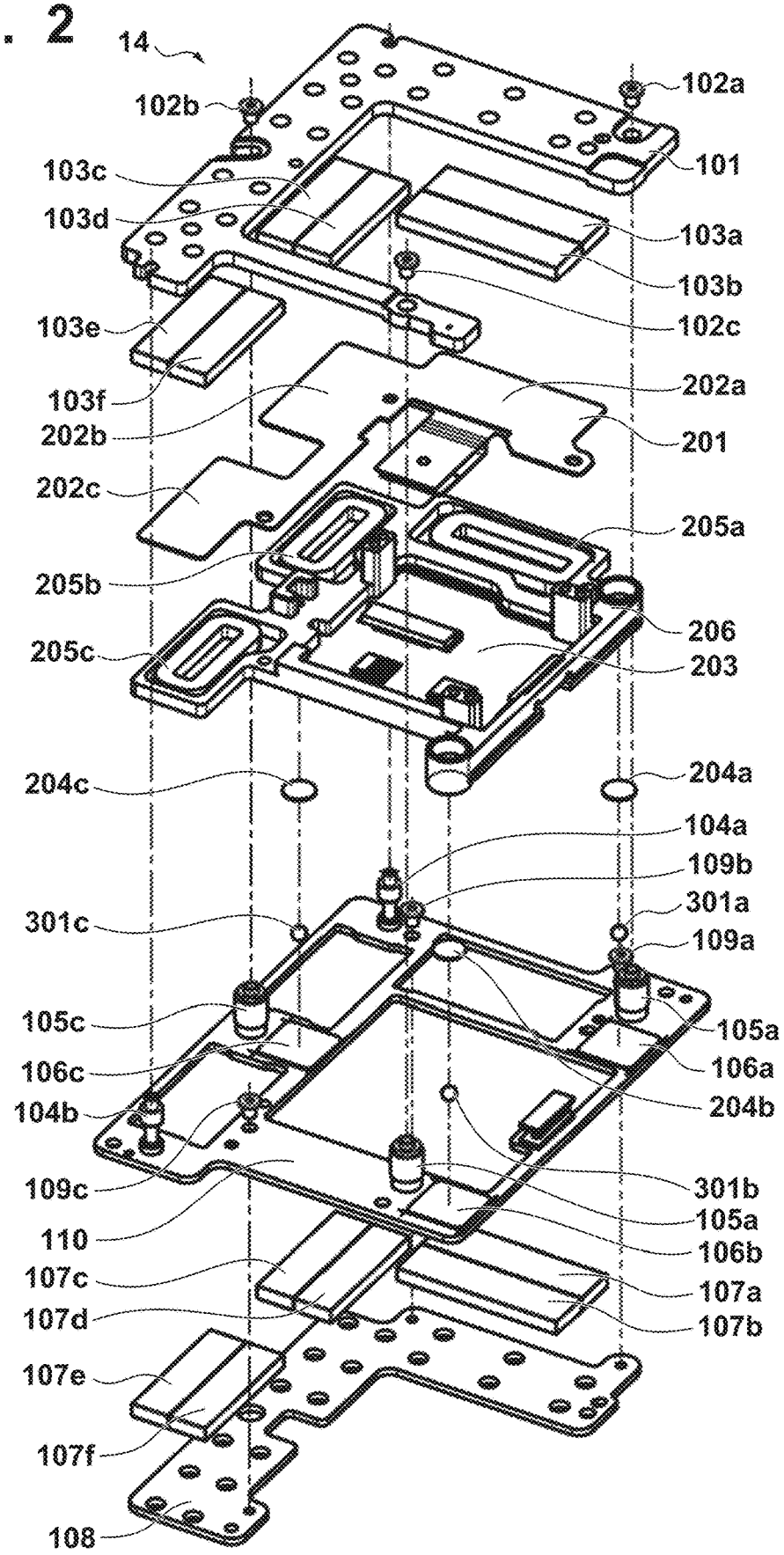
FIG. 2 is an exploded perspective view of a shake correction apparatus according to the embodiment.

Next, the image stabilization unit 14 of this embodiment will be described with reference to FIG. 2. FIG. 2 is an exploded perspective view of a mechanism that performs image stabilization in the image stabilization unit 14. Although there is an electrical mechanism for performing control, it is not included in the diagram shown in FIG. 2. In FIG. 2, vertical lines coincide with a direction parallel to the optical axis 4. In FIG. 2, members that do not move (fixed parts) are denoted by numbers in the 100s. Moving members (movable parts) are denoted by numbers in the 200s. Further, balls held between the fixed parts and the movable parts are denoted by numbers in the 300s.

In FIG. 2, reference numeral 101 denotes an upper yoke; 102a. 102b and 102c, screws; 103a, 103b, 103c, 103d. 103e and 103f, upper magnets; 104a and 104b, auxiliary spacers; 105a. 105b and 105c, main spacers; 106a, 106b and 106c, fixed part rolling plates; 107a, 107b, 107c, 107d, 107e and 107f, lower magnets, 108, a lower yoke; 109a, 109b and 109c, screws; and 110, a base plate.

Further, reference numeral 201 denotes an FPC; 202a, 202b, and 202c, position detection element mounting positions; 203, a movable PCB; 204a. 204b, and 204c, movable part rolling plates; 205a, 205b, and 205c, coils; 206, a movable frame; and 301a. 301b, 301c, balls.

The upper yoke 101, the upper magnets 103a, 103b, 103c, 103d, 103e, 103f, the lower magnets 107a, 107b, 107c, 107d, 107e, 107f, and the lower yoke 108 form a magnetic circuit and form a so-called closed magnetic circuit. The upper magnets 103a, 103b, 103c, 103d, 103e, and 103f are bonded and fixed in a state where they stick to the upper yoke 101. Similarly, the lower magnets 107a, 107b, 107c, 107d, 107e, and 107f are bonded and fixed in a state where they stick to the lower yoke 108. The upper magnets 103a, 103b, 103c, 103d, 103e, and 103f and the lower magnets 107a, 107b. 107c, 107d, 107e, and 107f are each magnetized in the optical axis direction (vertical direction in FIG. 2). Further, adjacent magnets (those in a positional relationship as the magnets 103a and 103b) are magnetized in opposite directions to each other. Further, the opposing magnets (those in a positional relationship as the magnets 103a and 107a) are magnetized in the same direction. By doing so, a strong density of magnetic flux is generated in the optical axis direction between the upper yoke 101 and the lower yoke 108.

Since a strong attracting force is generated between the upper yoke 101 and the lower yoke 108, the main spacers 105a, 105b, 105c and the auxiliary spacers 104a. 104b are configured to maintain appropriate space between the upper yoke 101 and the lower yoke 108. Here, the appropriate space means that the coils 205a. 205b, 205c and the FPC 201 are arranged between the upper magnets 103a, 103b, 103c, 103d, 103e, 103f and the lower magnets 107a. 107b, 107c, 107d. 107e, 107f, with a sufficient space. The main spacers 105a. 105b, and 105c are provided with screw holes, and the upper yoke 101 is fixed to the main spacers 105a, 105b, and 105c by the screws 102a, 102b, and 102c.

Rubber is installed on body portions of the main spacers 105a, 105b, and 105c to form mechanical end portions (so-called stoppers) of the movable portions.

The base plate 110 is provided with holes at areas corresponding to the lower magnets 107a, 107b. 107c, 107d, 107e, and 107f, and the surfaces of the magnets protrude through the holes. That is, the base plate 110 and the lower yoke 108 are fixed by the screws 109a, 109b, and 109c, and the lower magnets 107a, 107b, 107c, 107d, 107e, and 107f which are thicker than the base plate 110 are fixed so as to protrude from the base plate 110.

The movable PCB 203 is formed by magnesium die casting or aluminum die casting, and is light-weighted and very rigid. Each element of a movable part is fixed to the movable PCB 203 to form the movable part. In the FPC 201, position detection elements are mounted on a surface that cannot be seen from FIG. 2 at positions indicated by the position detection element mounting positions 202a, 202b, and 202c. For example, a Hall element can be used so that the position can be detected using the magnetic circuit described above. Since the Hall element is small, it is arranged so as to be nested inside of each winding of the coils 205a, 205b, 205c.

The movable PCB 203 is connected to the image sensor 6, the coils 205a, 205b, and 205c and hall elements (not shown). Electrical exchange with the outside is performed via a connector on the movable PCB 203.

The fixed part rolling plates 106a. 106b, and 106c are bonded and fixed to the base plate 110, and the movable part rolling plates 204a. 204b, and 204c are bonded and fixed to the movable PCB 203 to form rolling surfaces for the balls 301a, 301b, and 301c. By separately providing rolling plates, it becomes easy to design the roughness of the surface, hardness, etc. in a preferable state.

By providing a current to the coils 205a. 205b, and 205c with the above-described configuration, a force according to the Fleming's left-hand rule is generated, and it becomes possible to move the movable frame 206. Further, feedback control can be performed by using the signals of the Hall elements which are the position detection elements as described above. By appropriately controlling the values of signals of the Hall elements, it is possible to translate the movable part in a plane perpendicular to the optical axis 4 and rotate around the optical axis 4.

Next, with reference to FIGS. 3A to 3F, a description will be given regarding deterioration of peripheral image quality that occurs when image stabilization unit 14 performs image stabilization. When the image sensor 6 is driven by the movable frame 206 described with reference to FIG. 2 and the image stabilization control is performed, the brightness of the captured image may become unnatural depending on the position of the image sensor 6 during the exposure period.

Figure 3A:
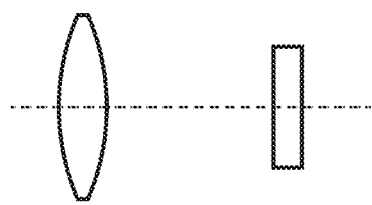
FIGS. 3A to 3F are diagrams illustrating image quality deterioration.
Figure 3B:
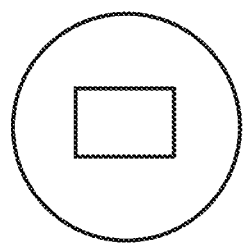
Figure 3C:
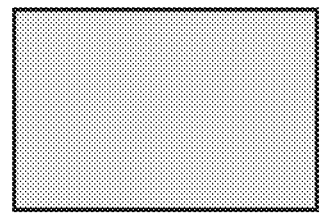

FIG. 3A is a diagram simply showing the positional relationship between the lens unit 2 and the image sensor 6. FIG. 3A shows a reference position of the image sensor 6 at which the optical axis 4 of the lens unit 2 and the central axis (optical axis) of the image sensor 6 coincide with each other. FIG. 3B is a view of FIG. 3A as viewed from the front, and a circle is drawn about the optical axis 4 as the center. In general, light amount change caused by the lens unit 2 occurs evenly in a concentric manner from the center of the circle, and usually the amount of light reaching the image sensor 6 decreases as the distance from the center of the concentric circle increases. In this case, the image sensor 6 is at the center of the circle, and an image exposed at this position is as shown in FIG. 3C, namely, an image in which the amount of light falls evenly from the center of the image sensor 6 to the four corners is captured. In addition, a good image can be obtained because the amount of drop of the amount of light at the four corners is small.

Figure 3D:
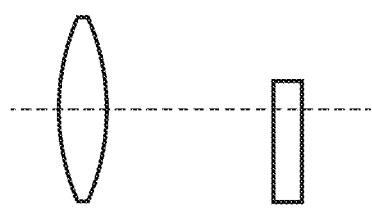
Figure 3E:
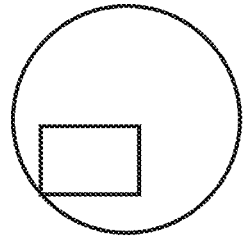
Figure 3F:
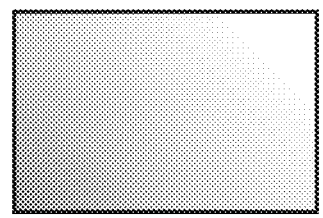

On the other hand, the diagram shown in FIG. 3D shows a case where the image sensor 6 is shifted in order to correct camera shake. It is necessary to shift the image sensor 6 in order to perform image stabilization, and depending on the state of camera shake before exposure, there may be a case where image stabilization is performed around a position as shown in FIG. 3D. In this case, the image sensor 6 is exposed in a state where the image sensor 6 is shifted from the center of the circle as shown in FIG. 3E, and as a result, as shown in FIG. 3F, an image in which the amount of light is greatly reduced at the left corner of the image is output. In addition, the amount of light at the four corners of the image is not uniform, and thus the image looks unnatural.

First Embodiment

Next, processing in the image capturing system having the above-described configuration according to the first embodiment of the present invention will be described. First, correction of a peripheral light amount will be described.

FIG. 4 is a flowchart showing an outline of so-called peripheral light amount correction in which peripheral darkening is corrected by image processing. First, in step S401, state information of the lens unit 2 in an exposure period during which the correction is performed is acquired. The information needed here is of states that affect the peripheral darkening characteristics of the lens unit 2, and includes focal length information, shooting distance information, aperture information, and the like. Next, in step S402, the amount of peripheral darkening of the lens unit 2 is calculated based on the information acquired in step S401. As a method of calculating the amount of peripheral darkening, the following method is conceivable. First, the peripheral light attenuation characteristics of the lens unit 2 is stored in memory 8 in advance, and the peripheral darkening characteristic under a condition corresponding to the information acquired in step S401 is searched, then the amount of peripheral darkening is obtained by interpolation.

In step S403, an allowable correction amount in the peripheral light amount correction corresponding to the image capturing apparatus main body 1 that performs the correction is acquired. The peripheral light amount correction is to correct peripheral darkening by electrically amplifying a signal by a gain. As a matter of course, image quality deterioration such as an increase in noise becomes conspicuous by amplifying the signal by the gain. How large gain can be used generally depends on the characteristics of the image sensor 6 and the characteristics of the image capturing apparatus main body 1. In addition, the image sensor 6 has a mechanism for amplifying a signal by analog or digital (so-called ISO sensitivity), and the noise characteristics change according to a set value, so that the peripheral light amount that can be corrected changes. Information on the allowable correction amount in the peripheral light amount correction is recorded for each of these conditions in the memory 8 in advance, and is changed depending on the ISO sensitivity or the like. Alternatively, the correction amount applicable to the peripheral light amount correction may be dynamically changed according to the setting of other functions for electronically correcting the brightness, such as the automatic exposure adjustment function and the automatic contrast adjustment function.

In step S404, the correction amount to be actually applied is calculated based on the allowable correction amount calculated in step S403. Here, the specific method will be explained using FIGS. 5A to 5C.

Figure 5A:
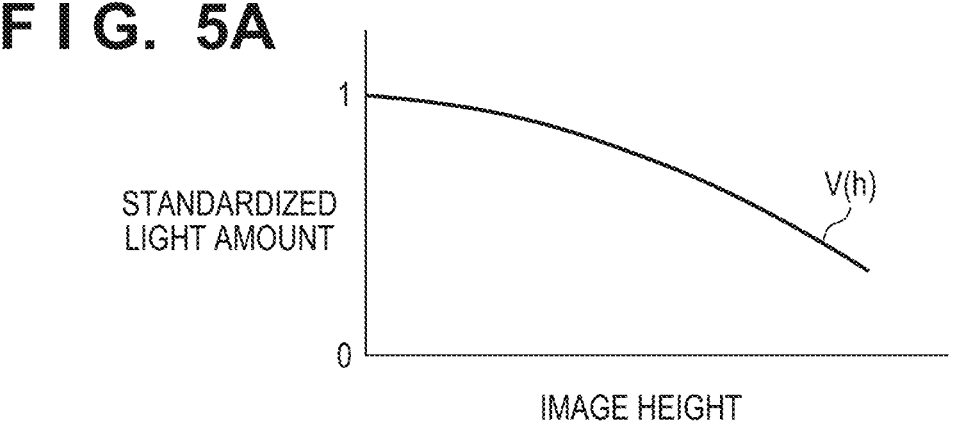
FIGS. 5A to 5C are diagrams for explaining processing for calculating a correction amount for the peripheral light amount correction according to the embodiment.
Figure 5B:
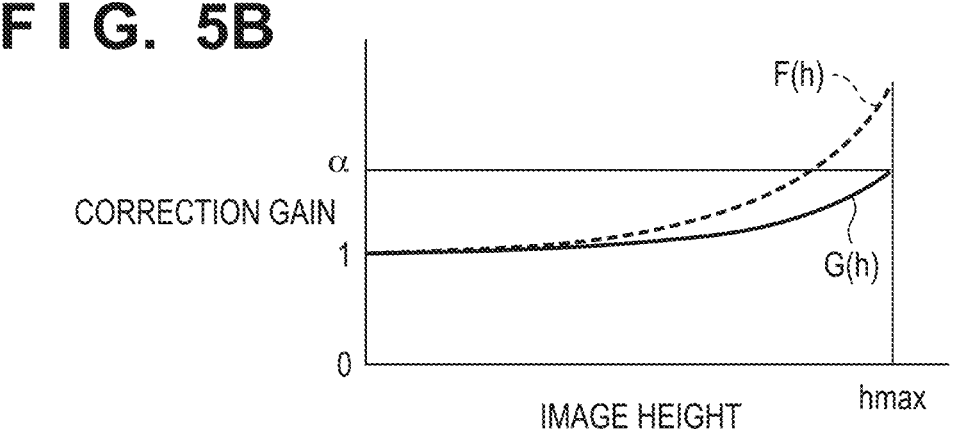

V(h) in FIG. 5A is a graph showing an example of the peripheral darkening characteristics of the lens unit 2 under given conditions, calculated in step S402. The horizontal axis represents the distance (image height) from the optical axis center, and the vertical axis represents light amount in each image height, the light amount being normalized with the light amount at the center of the image height as 1. FIG. 5B shows a graph representing correction gains used in the peripheral light amount correction under the same conditions as in FIG. 5A. F(h) represents a gain curve when V(h) is completely corrected. α indicates the maximum gain, which is the allowable correction amount acquired in step S403. As the peripheral light amount correction in this case, since it is necessary to suppress the maximum correction gain to the allowable correction amount α, the actual correction amount is calculated. The resulting correction amount is represented by G(h). It can be seen that the correction amount is within the maximum gain α allowed by the system.

Figure 5C:
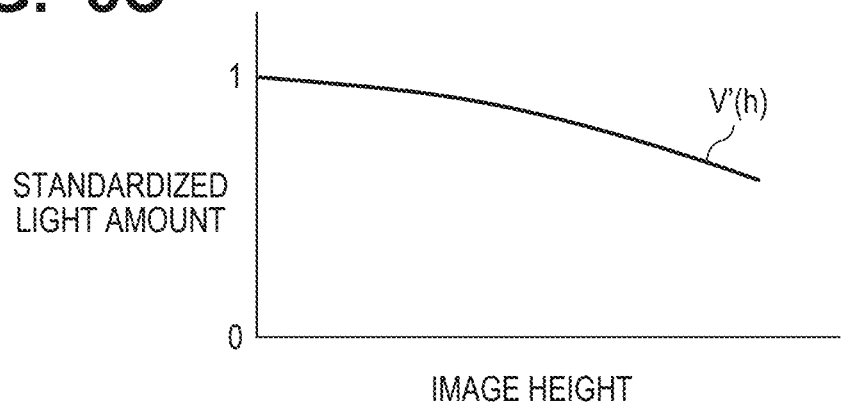

In step S405, the calculated correction gain G(h) is applied to the image. As a result, the corrected peripheral light amount characteristic is as shown in FIG. 5C. Although the peripheral darkening is not completely corrected, it is possible to output the corrected result to the maximum extent allowed by the system.

Next, the calculation process of an allowable drive amount of the image sensor 6 in the first embodiment will be described. In the image stabilization by shifting the image sensor 6, as explained with reference to FIG. 3F, there is a possibility that an unintended unnatural image is output if a drive amount of the image sensor 6 is determined without predicting how much the peripheral light amount falls while performing the image stabilization. On the other hand, especially in an interchangeable lens system, there is a problem in which if the allowable drive amount is set uniformly so as not to output an unnatural image as described above for all lenses, the effect of image stabilization is significantly reduced. Therefore, in the first embodiment, the allowable drive amount of the image sensor 6 is obtained according to the combination of the lens unit 2 and the image capturing apparatus main body 1.

Figure 6:
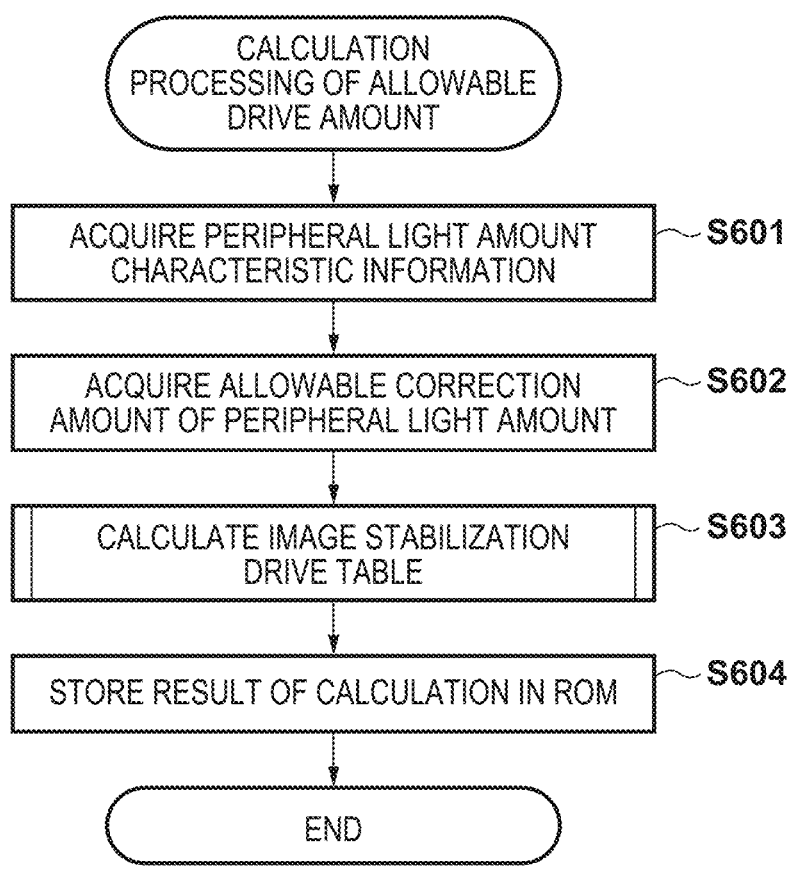
FIG. 6 is a flowchart illustrating calculation processing of an allowable drive amount of an image sensor according to the embodiment.

FIG. 6 is a flowchart showing the calculation process of the allowable drive amount in the first embodiment. As described above, the peripheral light amount changes depending on the peripheral light amount characteristic of the lens unit 2, the focal length, the shooting distance, the aperture, and the like. In the first embodiment, the allowable drive amount corresponding to each of these conditions is obtained and stored in advance before starting the image stabilization operation.

First, in step S601, peripheral light amount characteristic information of the entire area of the attached lens unit 2 is acquired. The acquisition method may be acquired from the lens unit 2, for example, or may be recorded in the memory 8 in advance. In step S602, the allowable correction amount of the peripheral light amount in the image capturing apparatus main body 1 is acquired. A specific example is information such as the maximum gain α acquired in step S403. When the maximum gain α changes according to the ISO sensitivity or the like, those conditions are also acquired.

In step S603, an image stabilization drive table is calculated based on the information acquired in steps S601 and S602. Details of the method for calculating the image stabilization drive table will be described later. Finally, in S604, the result of the calculation in step S603 is recorded in the memory 8, and the process ends.

The above-described processing is executed, for example, when the lens unit 2 is attached to image capturing apparatus main body 1, and the image stabilization drive table is stored in the memory 8 when shooting is started.

Next, a calculation method of the image stabilization drive table performed in step S603 will be described in detail with reference to FIG. 7. First, in step S701, drive amount determination thresholds are read from the memory 8. Here, the drive amount determination thresholds are thresholds that indicate the state of the peripheral light amount that is acceptable from the viewpoint of image quality, and are parameters that are set in advance according to the characteristics of the image capturing apparatus main body 1, and the like. Specifically, the drive amount determination thresholds are an absolute light amount determination threshold Lth, which is a parameter indicating how much the absolute amount of brightness of an output image can be reduced, and a four-corner light amount difference determination threshold Cth, which is a parameter indicating uniformity of the brightness at the four corners.

In step S702, shooting conditions for calculating the allowable drive amount are acquired. In the present embodiment, since calculation is performed according to ISO sensitivity, focal length, shooting distance, and aperture, calculation is performed while sequentially changing each condition. The number of conditions and intervals may be increased or decreased as necessary. Next, in step S703, the amount of peripheral darkening corresponding to the conditions acquired in step S702 is calculated. The following method is conceivable as a method of calculating the amount of peripheral darkening. Namely, as in step S402 described above, the peripheral darkening characteristics of the lens unit 2 are stored in the memory 8 in advance, and the peripheral darkening characteristic under the condition corresponding to the information acquired in step S702 is looked up, and the amount of peripheral darkening is obtained by interpolation.

Next, in step S704, on the basis of the ISO sensitivity and the like acquired in step S702, the correction amount of the peripheral light amount actually applied under the conditions is calculated in the same manner as in step S404. In step S705, in the same manner as in step S405, the correction is performed on the peripheral light amount acquired in step S703 using the correction amount acquired in step S704. By doing so, it is possible to simulate the brightness of the actually exposed image. From the simulation result of the correction calculated in step S705, the allowable drive amount under the conditions is determined in steps S706 and S707. The specific method is demonstrated here using FIGS. 8A to 8D.

Figure 8A:
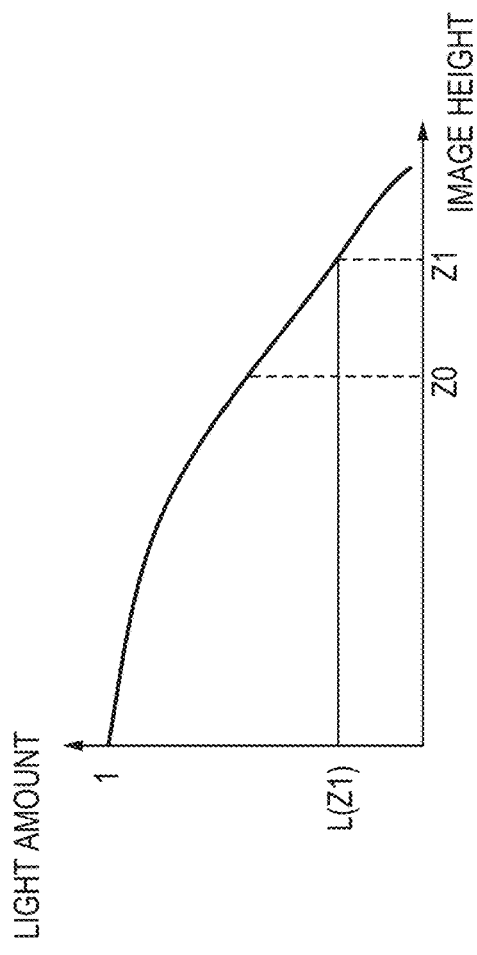
FIGS. 8A to 8D are diagrams for explaining a calculation method of the driveable amount of an image sensor according to a first embodiment.
Figure 8B:
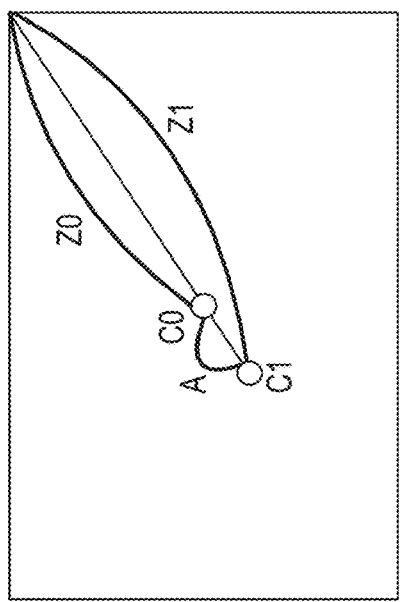
Figure 8C:
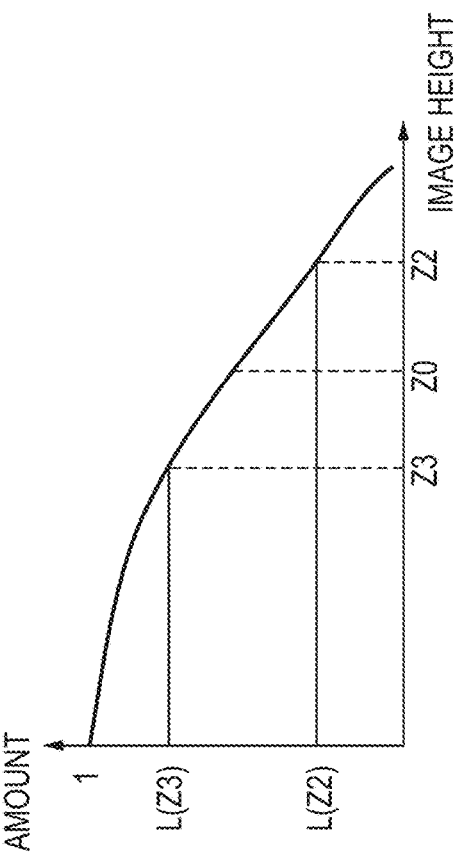
Figure 8D:
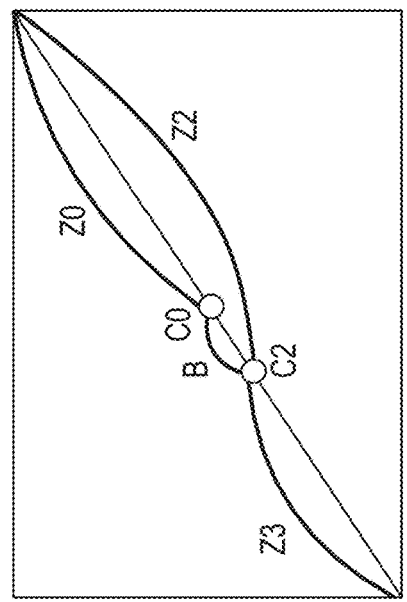

FIGS. 8A and 8B are diagrams for explaining the process in step S706, and FIGS. 8C and 8D are diagrams for explaining the process in step S707. FIG. 8A is a graph in which the horizontal axis represents the image height and the vertical axis represents the amount of light, and is a graph illustrating the characteristics of the result of peripheral light amount correction performed in the image capturing apparatus calculated in step S705. It indicates that when the correction cannot be sufficiently performed due to the influence of noise or the like, the light amount drop cannot be sufficiently corrected with respect to the center of the image height. Here, the image height Z0 is the image height of the outermost periphery in the peripheral portion of the image sensor 6 in a state where image stabilization is not performed, that is, when the center of the image sensor 6 and the optical axis of the lens unit 2 coincide. Hereinafter, the image height at the longest distance among the image heights at the four corners (peripheral portions) of the image sensor 6 from the center of the optical axis is referred to as "maximum image height".

FIG. 8B shows positions on the image sensor 6 corresponding to positions in FIG. 8A. For example, the distance corresponding to Z0 in FIG. 8A indicates the distance from the center position C0 of the image sensor 6 to the corner of the image sensor 6. In FIG. 8A, the light amount at the image height Z1 is L(Z1). That is, the image stabilization drive is possible until the periphery of the image sensor 6 overlaps the image height when the value of L(Z1) coincides with the absolute light amount determination threshold Lth acquired in step S701. In the case of Lth=L(Z1), when the center of the optical axis moves to the position C1 separated by the distance Z1 from the corner of the image in FIG. 8B, the light amount at the periphery of the image becomes the absolute light amount determination threshold Lth specified in advance. In other words, the allowable drive amount (first movement amount) of the image sensor 6 for image stabilization is A(=C0-C1).

Next, a method for acquiring the allowable drive amount B from the four corner light amount difference determination threshold value in step S707 will be described with reference to FIGS. 8C and 8D. In step S706, the allowable drive amount is determined using the absolute light amount, on the other hand, in step S707, an allowable drive amount is calculated so that the difference between brightness at the four corners of the output image does not exceed a predetermined value. FIG. 8C is a graph showing the result of calculating the brightness after the peripheral light amount correction in step S705 as in FIG. 8A. When determining the uniformity of the brightness at the four corners during image stabilization driving, the determination is made by comparing brightness of regions at the periphery of an image furthest and closest from/to the center of the optical axis.

For example, a case where the optical axis center in the image is moved from C0 to C2 by image stabilization control in FIG. 8D is considered. In this case, the maximum image height is Z2, and the minimum image height is Z3. That is, it can be seen that the brightness difference in the image is maximized between the image height Z2 and the image height Z3. The luminance difference at this time is expressed as a difference between L(Z2) and L(Z3) in FIG. 8C. That is, the C2 position is calculated such that L(Z2)-L(Z3) does not exceed a predetermined threshold Cth. Specifically, when the light amount difference in a case where the center of the optical axis moves to the position C2 in FIG. 8D is Cth, the allowable drive amount B (second movement amount) at that time is calculated as Z2-Z0.

Of the allowable drive amounts A and B calculated in steps S706 and S707, the smaller drive amount is able to ensure both the absolute light amount and the luminance difference between the four corners. Therefore, the smaller of the allowable drive amounts A and B is recorded as the allowable drive amount under the conditions used for calculation (step S708). This calculation is sequentially performed for all conditions to create an image stabilization drive table (step S709).

FIG. 9 is an example of the image stabilization drive table obtained as described above, and shows a case where the result of peripheral light amount correction changes depending on the ISO sensitivity, aperture, shooting distance, and focal length. This is just an example, and the corresponding parameters may be changed depending on the calculation time and the algorithm of the peripheral light amount correction. Intervals in conditions are also arbitrary. Here, $ISO0, ISO01, \ldots$, indicate ISO sensitivity division points, $Iris0, Iris1, \ldots$, indicate division points of aperture, $Focus0, Focus1, \ldots$ indicate division points of shooting distance, and $Zoom0, Zoom1, \ldots$ indicate division points of focal length. Data [0] [0] [0][0] indicates an image stabilization allowable drive amount for $ISO0$, $Iris0$, $Focus0$, and $Zoom0$.

As described above, the image stabilization unit 14 performs the image stabilization control based on the image stabilization drive table obtained in this way, so that the optimal image stabilization effects can be achieved for a combination of the lens unit 2 and image capturing apparatus main body 1.

Second Embodiment

Next, a second embodiment of the present invention will be described with reference to FIGS. 10, 11A, and 11B. In the second embodiment, a method for further improving the image stabilization effect by using a distortion aberration correction function in conjunction with the image stabilization drive table described in the first embodiment will be described. Note that a calculation process of the image stabilization drive table in the second embodiment is realized by changing the processes in steps S706 and S707 in FIG. 7, and the other processes are the same as those described in the first embodiment, and description thereof is omitted.

First, the distortion aberration correction will be briefly described. A subject and an image of the subject formed by a lens are ideally to have a similar shape. The distortion aberration is an aberration in which a straight line is distorted and deviated from the ideal state. There are two types of distortion aberration; in one type, an image is distorted outward (so-called barrel type) and in the other type, an image is distorted inward (so-called bobbin type), compared to an ideal state (state taken with a non-aberration lens).

Figure 10:
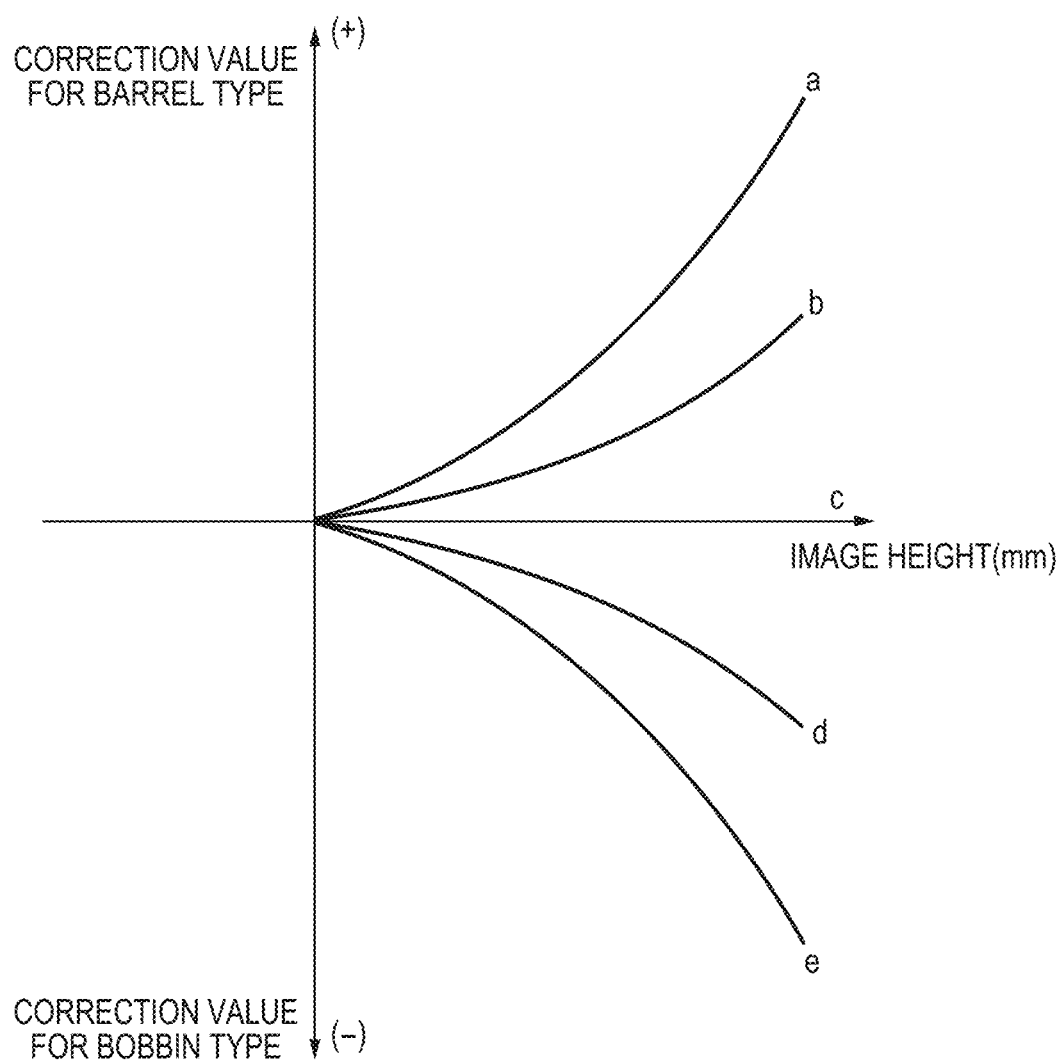
FIG. 10 is a graph showing a relationship between an image height and a correction value for distortion aberration according to a second embodiment.
Figure 11A:
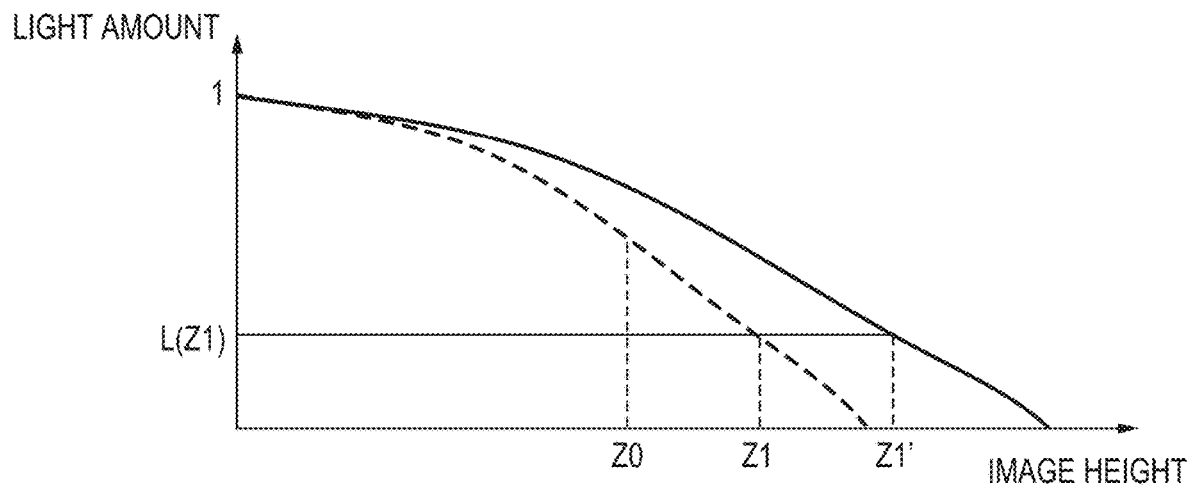
FIGS. 11A and 11B are diagrams for explaining a calculation method of an image stabilization drive amount according to the second embodiment.
Figure 11B:
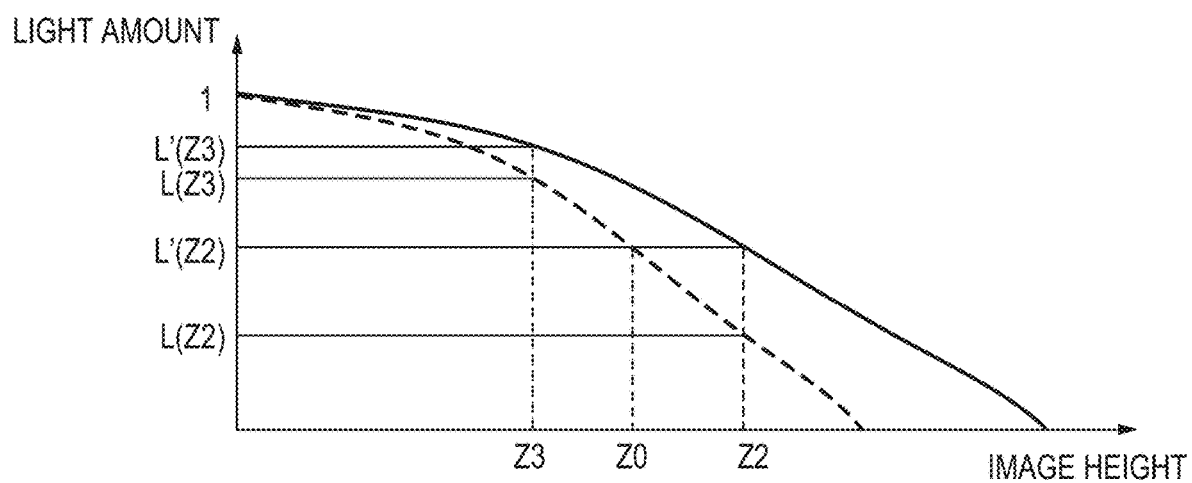

FIG. 10 is a graph showing the relationship between the image height and the distortion aberration correction value. In FIG. 10, the positive direction of the vertical axis indicates the correction value for barrel type distortion aberration, and the higher the value, the barrel type distortion aberration having a greater distortion amount occurs. Conversely, the negative direction of the vertical axis indicates the correction value for bobbin type distortion aberration, and the lower the value, the bobbin type distortion aberration having a greater distortion amount occurs.

This distortion aberration can be corrected by applying to the image a magnification that cancels the distortion amount of the lens unit for each image height. In the case of the barrel type, the distortion aberration can be corrected by performing an enlargement process for each image height, and in the case of the bobbin type, the distortion aberration can be corrected by performing a reduction process for each image height. Since the reduction process is performed in the correction for the bobbin type, the number of pixels is reduced by the correction, and it is necessary to apply an enlargement process to finally adjust the number of pixels. On the other hand, the enlargement process is performed in the correction for the barrel type, the number of pixels is increased by the correction, and it is not necessary to perform a reduction process.

In particular, in the case of the barrel type distortion aberration, since the correction is an enlargement process, an image inside the image without distortion correction is finally output. That is, an area that is not output as the final image is generated depending on the degree of distortion correction. Since this area is not output as the final image, if the drive amount is calculated in consideration of this area, the image stabilization drive amount can be further increased, and a further image stabilization effect can be expected.

A specific method for calculating the allowable drive amount will be described with reference to FIGS. 11A and 11B. The difference from the method of calculating the allowable drive amount in the first embodiment is that the distortion aberration amount is converted upon calculating the allowable drive amounts A and B in step S706 and S707. FIGS. 11A and 11B show changes in the peripheral light amount characteristics with respect to the image heights shown in FIGS. 8A and 8C, respectively, in a case where distortion correction is taken into considerations under the same conditions. A dotted line is a value before the correction for the barrel type distortion. In FIG. 11A, for the same absolute light amount L(Z1), the maximum image height Z1 is extended to Z1', so the distance from Z0 becomes longer. As a result, it can be seen that the calculated allowable drive amount A increases. On the other hand, in FIG. 11B, the four-corner luminance difference is changed from L(Z3)-L(Z2) to L'(Z3)-L'(Z2). In general, the peripheral light amount tends to decrease more steeply as the image height increases. Therefore, the lower the image height in the coordinate system before distortion correction, the smaller the luminance difference. Therefore, the allowable drive amount B is also expected to increase. In step S708, the smaller one of the allowable drive amount A and the allowable drive amount B calculated in this way may be selected.

As described above, it is possible to obtain a further image stabilization effect by taking distortion aberration into consideration.

Third Embodiment

Figure 12:
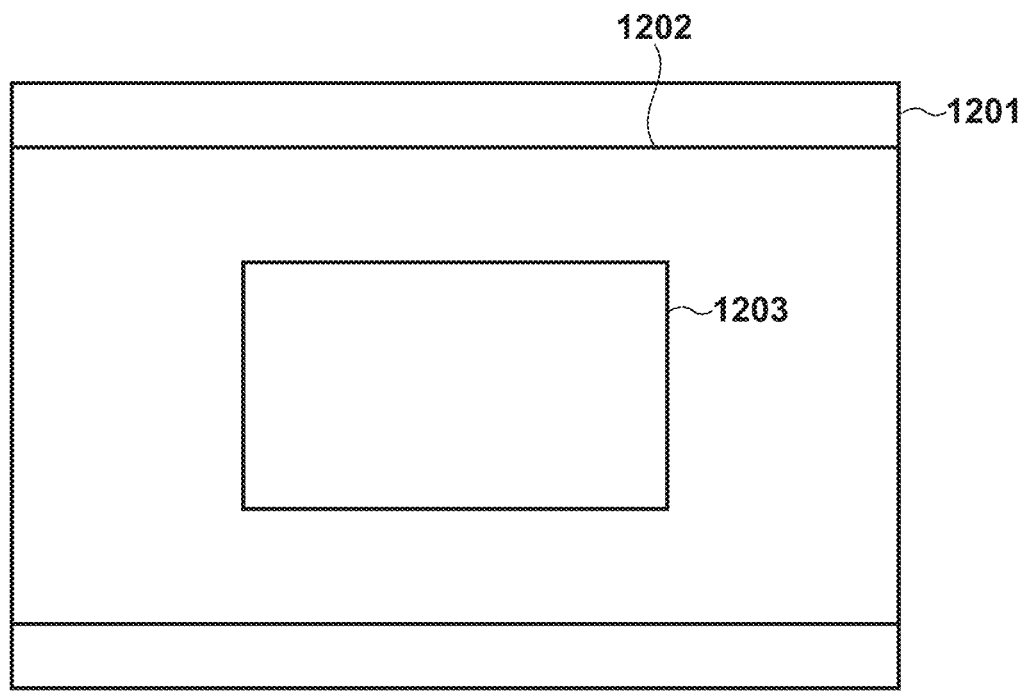
FIG. 12 is a diagram for illustrating a readout region of an image sensor according to a third embodiment.
Figure 13A:
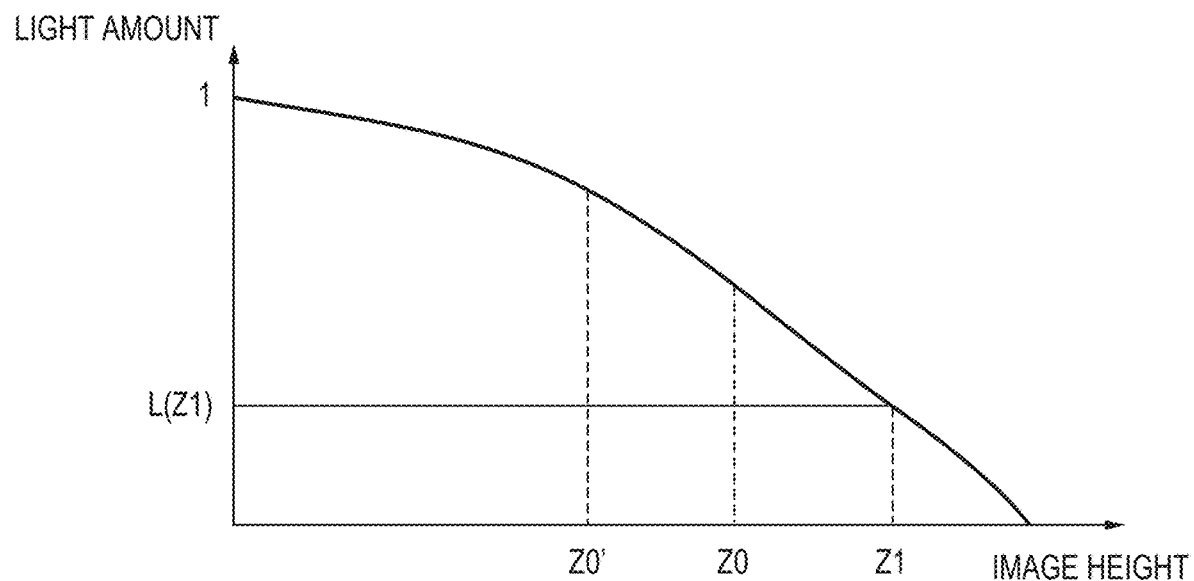
FIGS. 13A and 13B are diagrams illustrating a calculation method of an image stabilization drive amount according to the third embodiment.

Next, a third embodiment of the present invention will be described with reference to FIGS. 12, 13A and 13B. Since there is a case where a further image stabilization effect can be expected by taking the difference in the sensor readout mode in the image capturing apparatus main body 1 into consideration, the third embodiment will explain such case. Similarly to the second embodiment, the allowable drive amount that will be explained in the third embodiment is calculated by changing the processes in steps S706 and S707 in FIG. 7, and other processes are the same as those in the first embodiment. Therefore, an explanation thereof is omitted here.

In recent years, there are many image capturing apparatuses for still image shooting capable of capturing a moving image. In such apparatuses, a still image and a moving image are often generated by changing the readout area of one image sensor. FIG. 12 is a diagram showing readout areas. An area 1201 indicates a readout area in a mode in which all the angles of view of the image sensor 6 are used. In general, since the image sensor is designed for shooting a still image, the area 1201 is often used as the readout area for still image shooting. An area 1202 is an area used for shooting a moving image. In the case of moving image shooting, since the aspect ratio of the image is determined by the standard, the vertical angle of view is often narrowed comparing to a still image.

Finally, an area 1203 will be described. In general, in the moving image mode, the number of pixels that can be read out during one frame is determined, and when the area 1202 is read out, the number of pixels to be read out is adjusted by thinning out the pixels. Since the image quality is deteriorated by thinning out the pixels, there is a method of generating a moving image by performing sensor readout without thinning out pixels in order to keep the image quality. At this time, it is necessary to read out an inner area of the imaging surface of the image sensor 6 as shown by the area 1203. Further, there are cases where the area 1203 is read out in order to increase a zoom magnification electronically, and where the area 1203 is read out when a lens unit having a small image circle is attached. At this time, the order of the areas corresponding to the maximum image heights of output final images is 1201>1202>1203.

In this way, depending on the sensor reading mode, a required maximum image height may be small, and by taking this change into account, it is possible to further improve the image stabilization effect. The allowable correction amount in this case will be described with reference to FIGS. 13A and 13B.

The difference from the method of calculating the allowable drive amount in the first embodiment is that the value of the maximum image height Z0 when the image stabilization drive is not performed is converted depending on the read areas explained with reference to FIG. 12 upon calculating the allowable drive amounts A and B in steps S706 and S707 in FIG. 7. FIGS. 13A and 13B show values when the maximum image height information Z0 is converted to Z0' in a given mode with respect to the image heights shown in FIGS. 8A and 8C, respectively. In FIG. 13A, it can be seen that the distance from the reference position to the image height Z1 at which the same absolute light amount L(Z1) is obtained is extended (Z1-Z0'>Z1-Z0). This shows that the allowable drive amount A is improved.

Figure 13B:
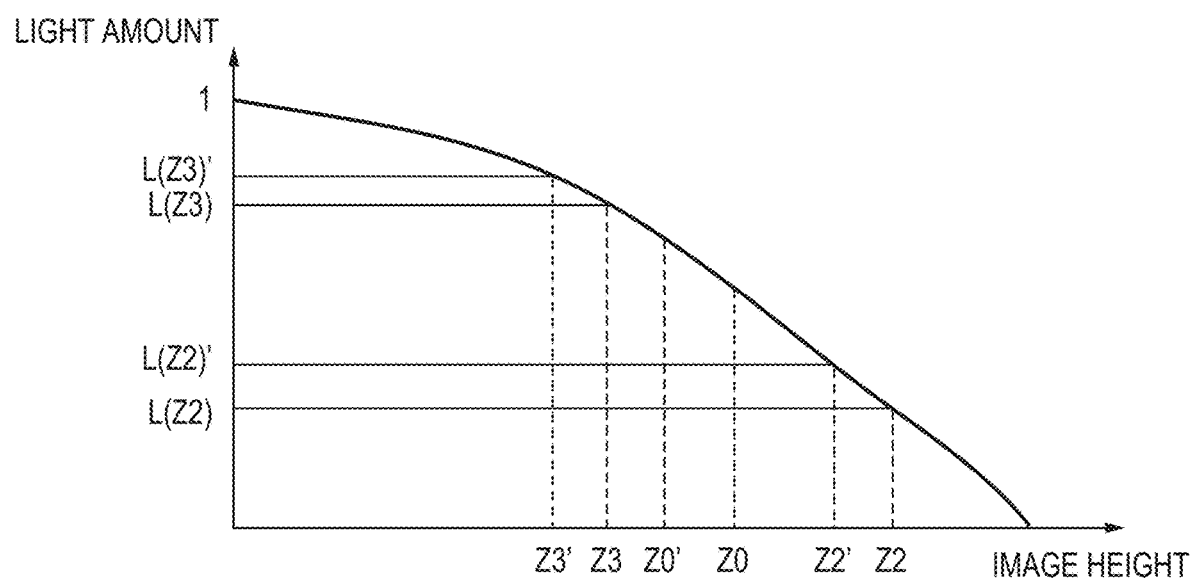

On the other hand, in FIG. 13B, the luminance difference at the four corners of the image sensor 6 is changed from L(Z3)-L(Z2) to L'(Z3)-L'(Z2). As described in the second embodiment, the lower the image height, the smaller the difference in luminance tends to be. Therefore, the allowable drive amount B is also expected to increase. In step S708, the smaller one of the allowable drive amount A and the allowable drive amount B calculated in this way may be selected.

As described above, it is possible to obtain a further image stabilization effect by taking the maximum image information in each mode into account.

Fourth Embodiment

Next, a fourth embodiment of the present invention will be described with reference to FIG. 14. In the first to third embodiments described above, the processing in a case where the peripheral light amount correction data of the lens unit 2 attached to the image capturing apparatus main body 1 is present is described. However, the image capturing apparatus main body 1 does not always have peripheral light amount correction data. Therefore, in the fourth embodiment, a case where the image capturing apparatus main body 1 does not have the peripheral light amount correction data of the lens unit 2 will be described.

Figure 7:
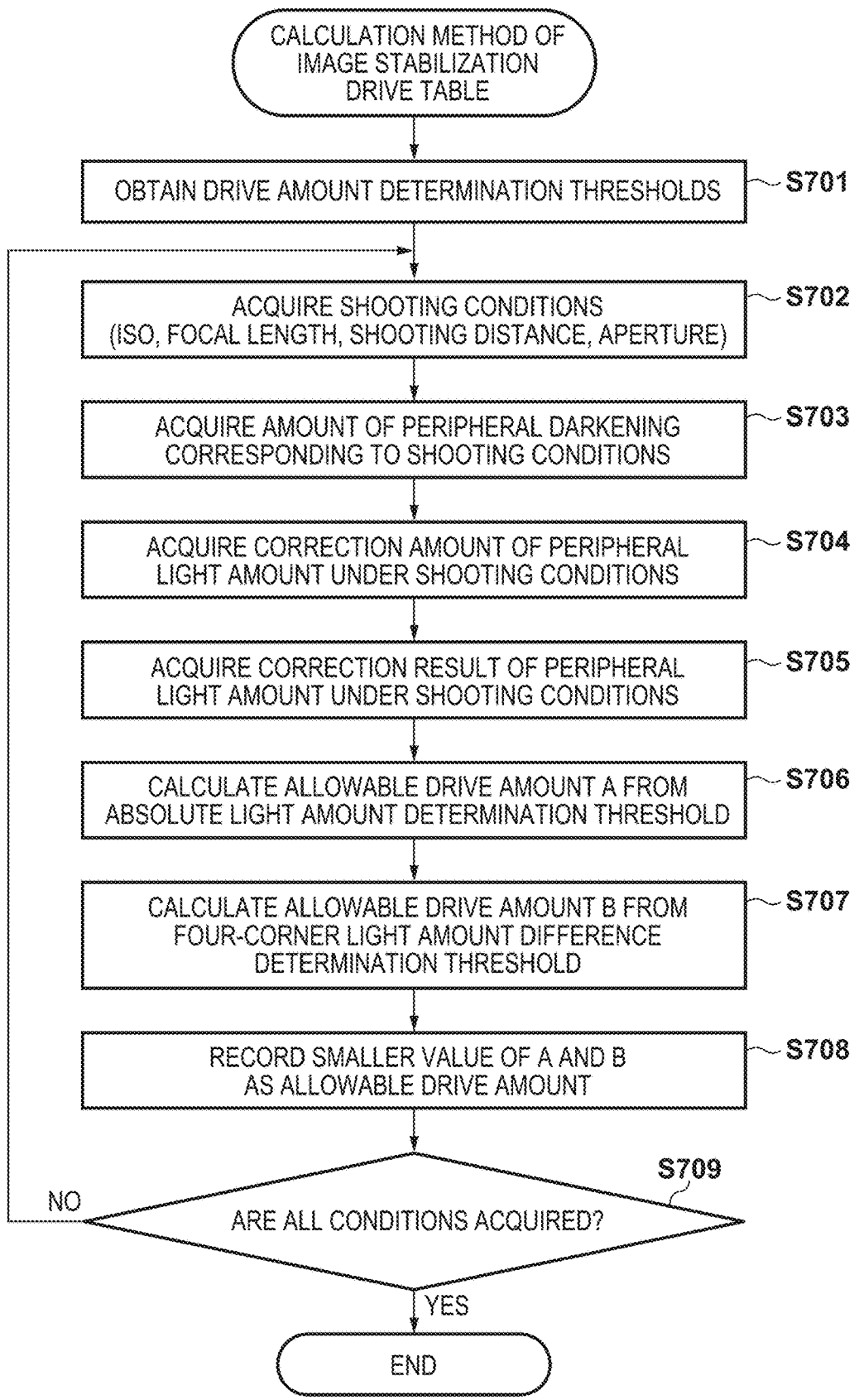
FIG. 7 is a flowchart showing calculation processing of an image stabilization drive table according to a first embodiment.
Figure 14:
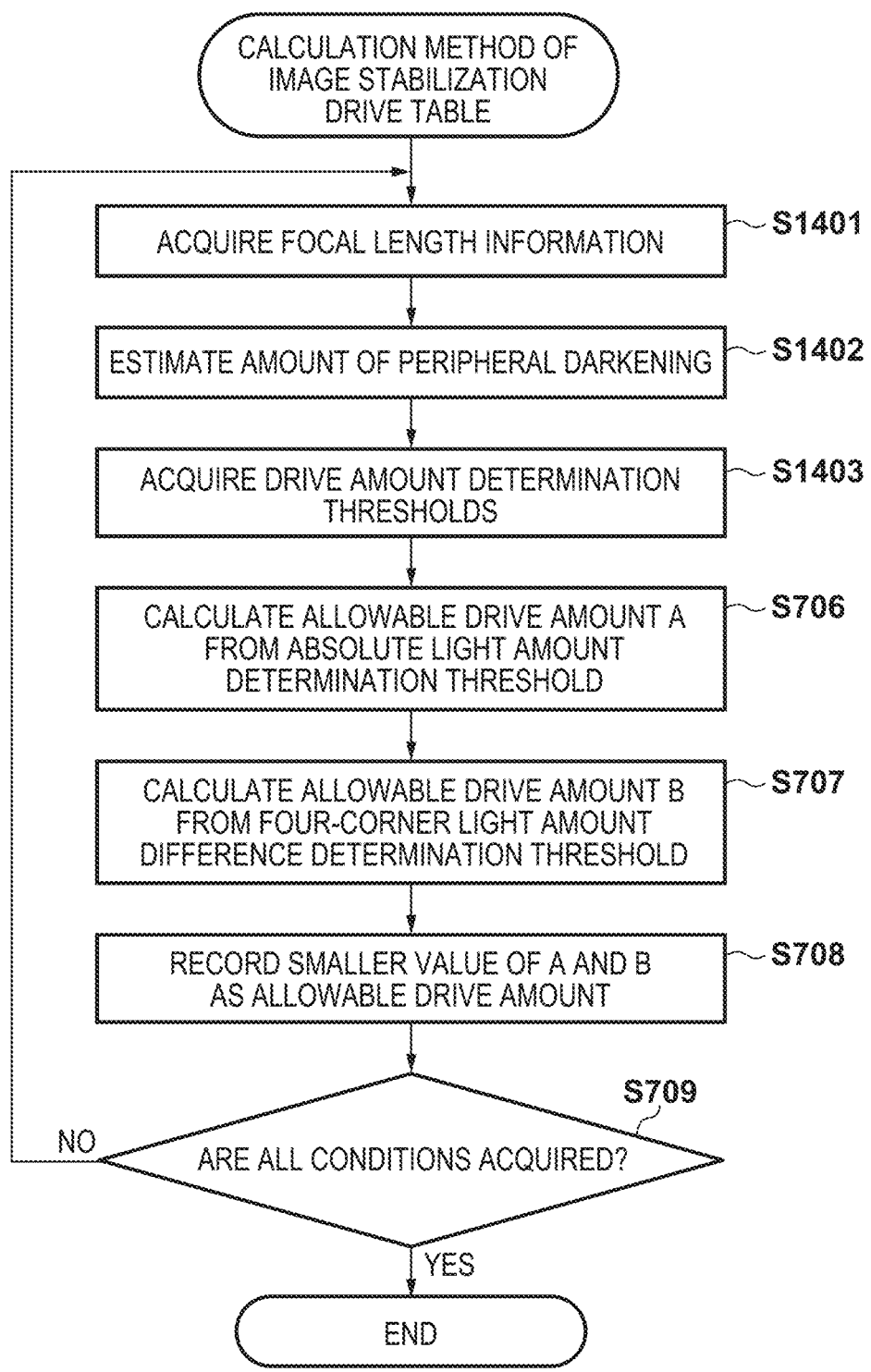
FIG. 14 is a flowchart illustrating calculation processing of an image stabilization drive table according to a fourth embodiment.

FIG. 14 is a flowchart showing image stabilization drive table calculation processing according to the fourth embodiment, which is performed in step S603 of FIG. 6 instead of the processing shown in FIG. 7. In addition, in step S402 in FIG. 4, instead of acquiring the peripheral darkening characteristics of lens unit 2 from the memory 8, the following method is used for estimation. Since other than this is the same as that of the first embodiment, description thereof is omitted here. In FIG. 14, the same processes as those in FIG. 7 are denoted by the same step numbers, and description thereof is omitted.

In step S1401, focal length information for calculating an allowable drive amount is acquired. Next, the amount of peripheral darkening according to the focal length information acquired in step S1402 is estimated. As an example of the estimation method, a case where a cosine fourth law is used will be described. It is possible to estimate a change in light amount for each image height using the following formula.

$$I = I_0 \cos^4 \theta(Z)$$

$$\theta(Z) = \arctan(Z/f)$$

Here, $I_0$ is the illuminance before incidence of light, I is the illuminance after incidence of light, $\theta(Z)$ is the incident angle at the image height Z, Z is the image height, and f is the focal length. Note that the estimation method of peripheral darkening is not limited to the above method.

Next, in step S1403, drive amount determination thresholds are acquired, and the processes of step S706 and subsequent steps are performed. The image stabilization drive table is generated by repeating the above processes for all conditions.

As described above, it is possible to maximize image stabilization effects while ensuring an image quality in case where the image capturing apparatus main body 1 does not have the peripheral light amount correction data.

Fifth Embodiment

Next, a fifth embodiment of the present invention will be described. In the first to fourth embodiments described above, the example in which the peripheral image quality drops due to the decrease in the peripheral light amount of the lens unit 2 attached to the image capturing apparatus main body 1 has been described. In the fifth embodiment, an example will be described in which peripheral image quality is deteriorated due to blurring caused by aberration of the lens unit 2.

First, correction of blur due to lens aberration will be described.

The blur component of the image is caused by spherical aberration, coma aberration, field curvature, astigmatism, and so on, of the optical system. In a case where there is no aberration and no influence of diffraction, the light beam emitted from one point of the subject ideally converges again at one point on the imaging surface. However, due to these aberrations, the light beam emitted from one point of the subject does not converge at one point but spreads on the imaging surface, which is represented by a blur component of the image. Optically, this phenomena is expressed by a point spread function (PSF), and this is called a blur component in an image. Speaking of image blur, for example, an out-of-focus image is also blurred, but here it refers to a blur in an image due to the above-mentioned aberrations of the optical system even if it is in focus. Also, color blur in a color image can be said to be a difference in blurring for each wavelength of light if the color blur is due to axial chromatic aberration, spherical aberration of color, and coma aberration of color of the optical system. Further, the lateral color misregistration can also be said to be a positional shift or a phase shift due to a difference in imaging magnification for each wavelength of light if the lateral color misregistration is caused by chromatic aberration of magnification of the optical system.

An optical transfer function (OTF) obtained by performing Fourier transform on PSF is aberration frequency component information and is represented by a complex number. The absolute value of the OTF, that is, the amplitude component is called Modulation Transfer Function (MTF), and the phase component is called Phase Transfer Function (PTF). Therefore, MTF and PTF indicate the frequency characteristics of the amplitude component and phase component of image degradation due to aberration, respectively. Here, the phase component is represented by the following equation (1) as the phase angle. Re(OTF) and Im(OTF) represent the real part and the imaginary part of the OTF, respectively.

$$PTF = \tan^{-1}(Im(OTF)/Re(OTF)) \qquad (1)$$

As described above, the OTF of the imaging optical system deteriorates the amplitude component and the phase component of an image, and the deteriorated image is in a state where each point of the subject is asymmetrically blurred like coma aberration.

As a method for correcting the deterioration of the amplitude (MTF) and the deterioration of the phase (PTF), a method of correcting the deterioration using the information of the OTF of the imaging optical system is known. This method is called image restoration or image reconstruction. Hereinafter, processing for correcting image degradation using OTF information of the imaging optical system is called image restoration processing or restoration processing.

Here, an outline of the image restoration processing will be explained. When the degraded image is denoted by g(x,y), the original image is denoted by f(x,y), and the PSF obtained by performing inverse Fourier transform on the optical transfer function is denoted by h(x,y), the following equation (2) holds. Here, *indicates convolution and (x,y) indicates coordinates on the image.

$$g(x,y) = h(x,y) * f(x,y) \qquad (2)$$

Moreover, when this is Fourier-transformed and converted into a display format on the frequency plane, a product format for each frequency is obtained as expressed in the following equation (3). H is OTF because it is obtained by performing Fourier transform on PSF. (u, v) indicates coordinates on a two-dimensional frequency plane, that is, a frequency.

$$G(u,v) = H(u,v) \cdot F(u,v) \qquad (3)$$

In order to obtain the original image from the captured degraded image, both sides of the equation (3) should be divided by H as follows.

$$G(u,v)/H(u,v)=F(u,v) \qquad (4)$$

The original image f(x,y) is obtained as a restored image by performing inverse Fourier transform on F(u, v) and returning it to the real space.

Here, assuming that R is obtained by performing inverse Fourier transform on 1/H of the above equation (4), the original image can be similarly obtained by performing the deconvolution process on the image in the real space as in the following equation (5).

$$g(x,y)*R(x,y)=f(x,y) \qquad (5)$$

The R(x,y) is called an image restoration filter. Since an actual image has a noise component, using an image restoration filter created by taking the complete reciprocal of OTF as described above amplifies the noise component together with the deteriorated image, and generally a good image cannot be obtained. Regarding this point, for example, a method of suppressing the recovery rate on the high frequency side of an image according to the intensity ratio of the image signal and the noise signal is known, such as a Wiener filter. Regarding a method for correcting the deterioration of the color blur components of the image, for example, the correction is done when the blur amounts for respective color components of the image become uniform by the correction of the blur component.

Since the OTF fluctuates according to the shooting conditions such as states of the zoom position and the aperture diameter, it is necessary to change the image restoration filter used in the image restoration processing accordingly.

Figure 15:
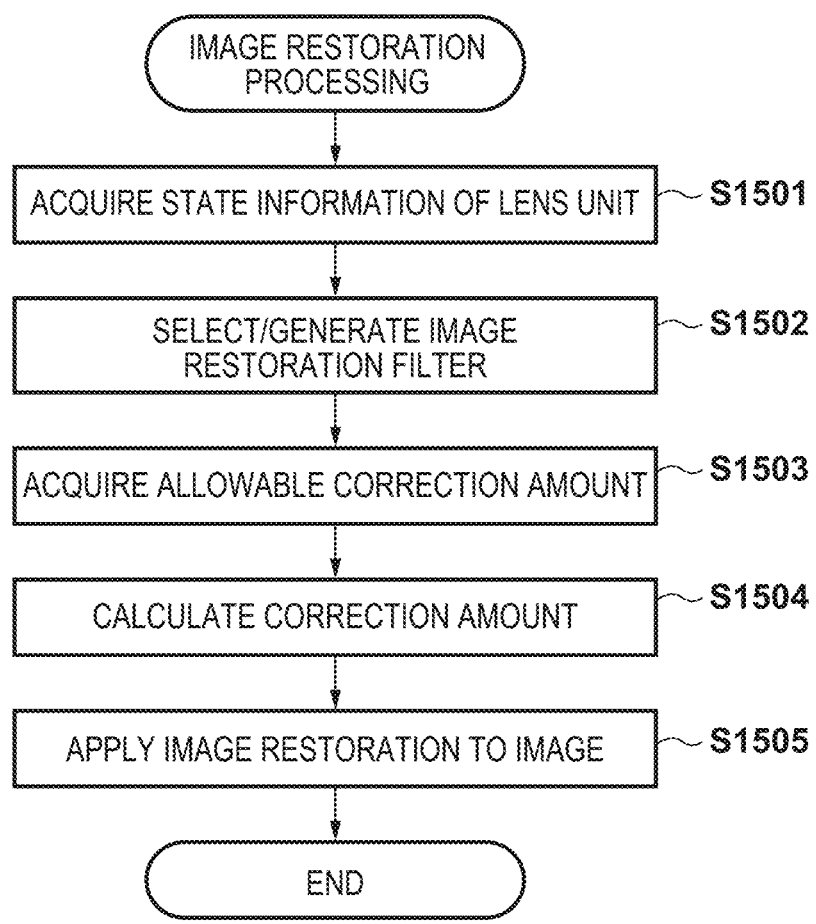
FIG. 15 is a flowchart illustrating image restoration processing according to a fifth embodiment.

FIG. 15 is a flowchart showing an outline of image restoration processing. First, in step S1501, state information of the lens unit 2 in an exposure period during which the correction is performed is acquired. The information needed here is of states that affect the aberration characteristics of the lens unit 2, and includes focal length information, shooting distance information, aperture information, and the like. In step S1502, an image restoration filter R(x, y) is selected based on the information acquired in step S1501.

At this time, the selected image restoration filter may be corrected as needed. This is because, in order to reduce the number of data of the image restoration filter that is prepared in advance in the memory 8, data of discrete shooting states is prepared, and an image restoration filter is corrected upon actually executing the processing in the image restoration process. Further, instead of selecting an image restoration filter, an image restoration filter corresponding to shooting states may be generated based on the information on OTF or PSF which is necessary for generating the image restoration filter.

In step S1503, an allowable correction amount for image restoration is acquired in accordance with the image capturing apparatus main body 1 that performs image restoration. As above described correction principle, correction by image restoration may cause noticeable image quality degradation such as an increase in noise. To what extent the correction can be made generally depends on the characteristics of the image sensor 6 and the characteristics of the image capturing apparatus main body 1. In addition, the image sensor 6 has a mechanism for amplifying a signal by analog or digital (so-called ISO sensitivity), and the noise characteristics change according to a set value, so that the image restoration amount that can be corrected changes. Information on the allowable correction amount in the image restoration is recorded for each of these conditions in the memory 8 in advance, and is changed depending on the ISO sensitivity or the like.

In step S1504, the correction amount to be actually applied is calculated based on the allowable correction amount calculated in step S1503. Here, the specific method will be described using FIGS. 16A and 16B and FIGS. 17A to 17C.

Figure 16A:
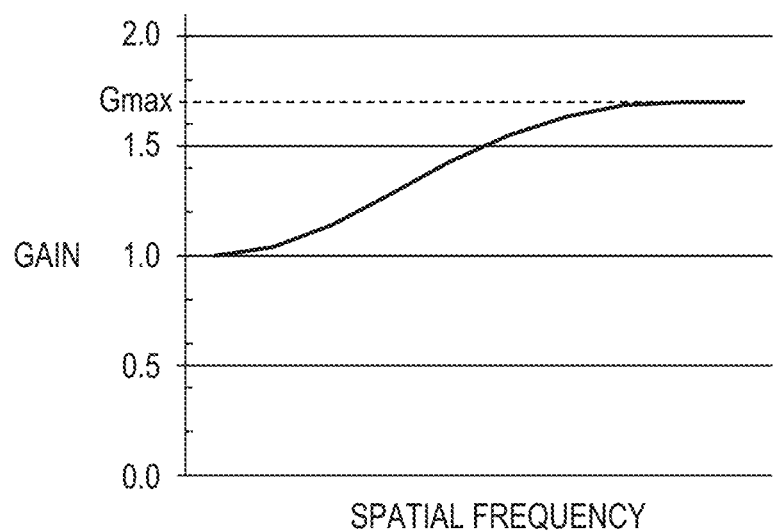
FIGS. 16A and 16B are diagrams showing frequency characteristics of image restoration according to the fifth embodiment.

FIG. 16A is a diagram illustrating an example of the absolute values of 1/H in the equation (4), in which the horizontal axis represents the spatial frequency and the vertical axis represents the gain. In other words, FIG. 16A is a diagram showing gain characteristics of the image restoration filter for each frequency. In this gain characteristics, the maximum value Gmax is referred to herein as the maximum gain value.

Figure 16B:
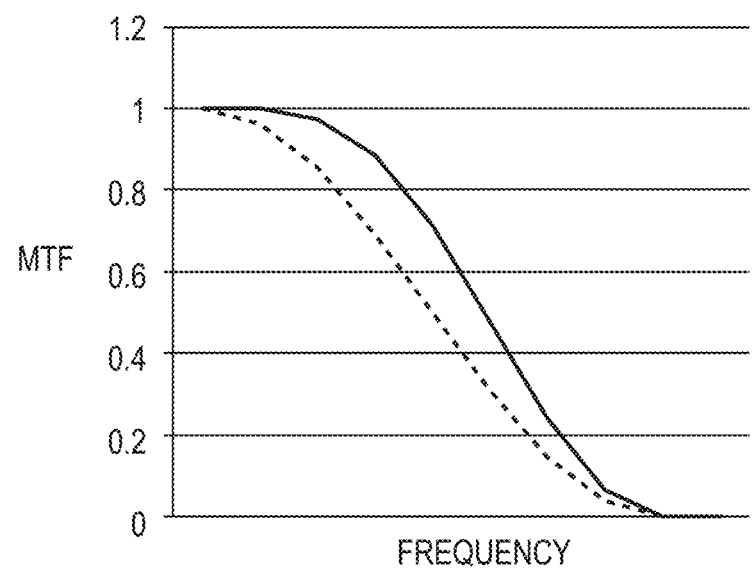

FIG. 16B is a diagram illustrating an example of a change in the amplitude component MTF before and after correction by the image restoration processing. The dotted line represents the amplitude component MTF before the correction, and the solid line represents the amplitude component MTF after the correction.

The amplitude component MTF represents a frequency characteristics of the amplitude component of image degradation due to aberration, and as shown in FIG. 16B, the amplitude component MTF is high on the low frequency side and the amplitude component MTF is low on the high frequency side. When the amplitude component MTF approaches zero, the real part and imaginary part of the OTF approach zero, and when the frequency that can be resolved by the imaging optical system is exceeded, the real part and imaginary part become zero.

FIG. 17A is a graph in which the horizontal axis shows a distance (image height) from the optical axis center and the vertical axis shows an example of an average value of MTFs at each image height, and M(h) indicates characteristics of the optical system at the time of shooting. Here, an example is shown in which the average value of the MTF decreases as the image height increases.

FIG. 17B is a graph showing the maximum gain value for image restoration. Fm(h) is a curve of the maximum gain value of the image restoration filter acquired in step S1502. The Fm(h) may be prepared in the memory 8 in advance, or may be generated based on various information acquired in step S1502.

β is the allowable correction amount acquired in step S1503. As image restoration in this case, since it is necessary to suppress the maximum gain value to an allowable correction amount β the maximum gain value to be used in actual correction is calculated. Gm(h) is the maximum gain value when the calculation result is applied. It can be seen that Gm(h) falls within β allowed by the system.

The correction amount K(h) at a certain image height h is obtained by the following equation (6).

$$K(h)=Gm(h)/Fm(h) \qquad (6)$$

In step S1505, the image restoration filter R(x,y) is applied as shown in the equation (5). Then, the image g(x,y) before the image restoration and the image f(x,y) after the image restoration are synthesized with weights based on the correction amount K(h) to obtain a final restored image.

As a result, the MTF average value after the image restoration has the characteristics as shown in FIG. 17C.

M'(h) indicates the characteristics after the image restoration using the image restoration filter R(x,y). M"(h) indicates the characteristics after the final image restoration using the correction amount K(h), and it is possible to output a resultant image corrected to the maximum extent within the range allowed by the system.

Next, the calculation process of the allowable drive amount of the image sensor 6 according to the fifth embodiment will be described. In the image stabilization by shifting the image sensor 6, there is a possibility that an image whose image quality is degraded in the peripheral region is output, as described above, if a drive amount of the image sensor 6 is determined without predicting how much the image quality in the peripheral region falls due to blur while performing the image stabilization. On the other hand, especially in an interchangeable lens system, there is a problem in which if the allowable drive amount is set uniformly so as not to output an image having a degraded portion for all lenses, the effect of image stabilization is significantly reduced. Therefore, the allowable drive amount of the image sensor 6 is obtained according to the combination of the lens unit 2 and the image capturing apparatus main body 1.

Figure 18:
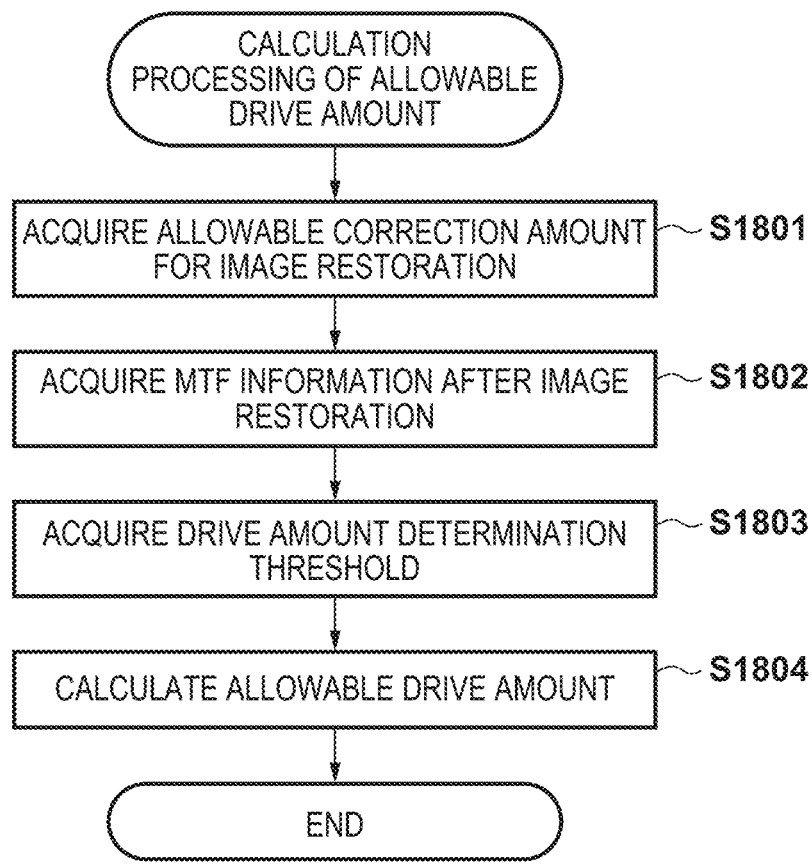
FIG. 18 is a flowchart illustrating calculation processing of an allowable drive amount of an image sensor according to the fifth embodiment.

FIG. 18 is a flowchart showing the calculation process of the allowable drive amount in the fifth embodiment.

First, in step S1801, an allowable correction amount for image restoration in the image capturing apparatus main body 1 is acquired. A specific example is information such as the allowable correction amount β, which is the upper limit value of the maximum gain value acquired in step S1503. If the allowable correction amount β changes according to the ISO sensitivity or the like, those conditions are also acquired.

In step S1802, MTF information of the entire area of the attached lens unit 2 after image restoration is acquired. Specifically, this process is to acquire information corresponding to M″ (h) shown in FIG. 17C.

This can be recorded in the memory 8 in advance. Alternatively, MTF information after image restoration may be generated or estimated based on information related to OTF and PSF necessary for generating the image restoration filter in step S1502.

In step S1803, the drive amount determination threshold Mth are read out from the memory 8. Here, the drive amount determination thresholds are thresholds that indicates the state of the MTF average value that is acceptable from the viewpoint of image quality, and are parameters that are set in advance according to the characteristics of the image capturing apparatus main body 1, and the like.

The effect of blur due to lens aberration varies depending on the pixel pitch of the image sensor 6. Even if the amount of aberration is such that the aberration is inconspicuous when the pixel pitch is large, the aberration may be noticeable when the pixel pitch is small. Therefore, an allowable threshold is set according to the characteristics of the image sensor 6. For example, in a case where information on drive amount determination threshold Mth is acquired from the lens unit 2, it is possible to reduce the influence of conspicuous aberrations when the pixel pitch is small by increasing the drive amount determination thresholds Mth as the pixel pitch is smaller.

In step S1804, an allowable drive amount for image stabilization driving is calculated based on the information acquired in steps S1801, S1802, and S1803.

Figure 19:
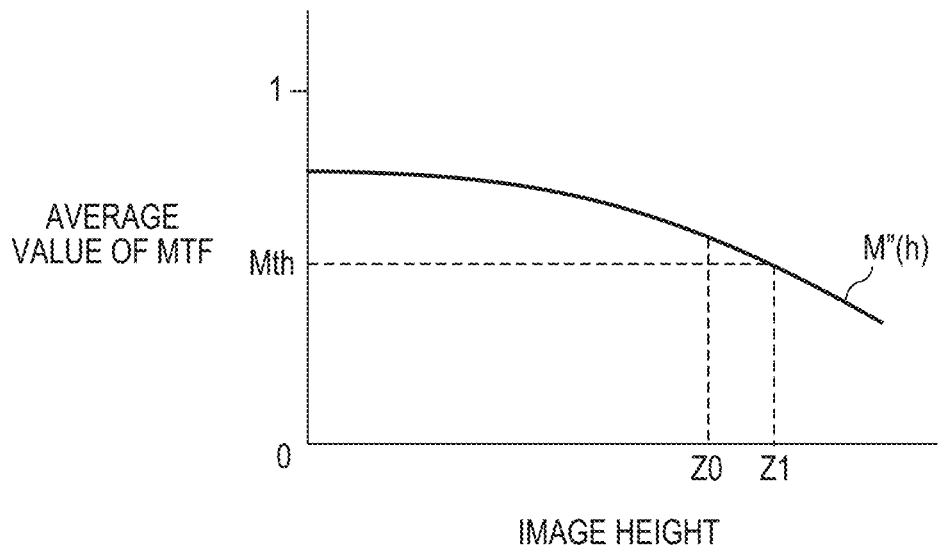
FIG. 19 is a diagram for explaining a calculation method of the allowable drive amount of the image sensor according to the fifth embodiment.

FIG. 19 is a diagram showing the image height on the horizontal axis and the MTF average value on the vertical axis. Here, M″(h) is an MTF average value after image restoration, and Mth is drive amount determination thresholds. The image height Z0 is the image height of the outermost periphery in the peripheral portion of the image sensor 6 in a state where image stabilization is not performed, that is, when the center of the image sensor 6 and the optical axis of the lens unit 2 coincide.

In this example, the image height that satisfies drive amount determination threshold Mth is up to Z1. That is, the allowable drive amount of the image sensor 6 for image stabilization is Z1-Z0.

As an example of calculating the allowable drive amount, as described in the first embodiment, the allowable drive amount may be calculated in consideration of the difference between the four corners.

Such an allowable drive amount may be calculated for each combination of ISO sensitivity, aperture, shooting distance, and focal length as in the first embodiment, and stored in the image stabilization drive table shown in FIG. 9, and in this embodiment, an example in which the minimum value of the allowable drive amount is set for each focal length will be described.

FIG. 20 is an example of the image stabilization drive table in the present embodiment. The allowable drive amount is calculated for each combination of ISO sensitivity, aperture, and shooting distance, and only the image stabilization drive amount that is the minimum with respect to each focal length is stored in the image stabilization drive table in association with the focal length.

By doing so, there may be a case where the image stabilization drive amount may be reduced depending on the shooting conditions, but it is possible to reduce the effect of changes in the image stabilization drive amount in a case where the shooting conditions change continuously, such as during shooting a moving image. For example, when the drive amount for image stabilization reaches the allowable drive amount, and if the allowable drive amount is reduced due to a change in shooting conditions, the change in the allowable drive amount may cause image blur. In such case, it is possible to maintain the continuity of the image stabilization drive during shooting a moving image, for example, by changing the allowable drive amount depending on the focal length and not by changing the allowable drive amount depending on other conditions, as in this embodiment.

Further, the allowable drive amount can be calculated in consideration of both image quality deterioration due to blur caused by aberration and the above-described image quality deterioration due to peripheral light amount. An example is shown in FIG. 21.

First, in step S2101, an allowable drive amount Dm by MTF is acquired by the process shown in FIG. 18.

In step S2102, an allowable drive amount Dv based on the peripheral light amount characteristics is acquired as described in the first embodiment.

Next, in step S2103, allowable drive amounts Dm and Dv are compared, and the smaller one is set as an allowable drive amount in step S2104 or S2105.

In this way, it is possible to obtain an optimal image stabilization effect in consideration of the image quality by MTF and the brightness by the peripheral light amount.

In addition, among the image signals read from the image sensor 6, the image area to be actually recorded may be a further inner area. For example, when a plurality of shot still images are aligned and then combined, the combined image may be cropped for the purpose of cutting off the protruding portion due to the alignment. In addition, when the image quality is further improved by shifting the image of each frame to be recorded in the moving image so as to match the position of the previous and next images, the image may be cropped so that no protruding area appears. These crop amounts may be determined in advance, for example, in an area of 80% of the original image.

As described above, in the case where the range of the image to be actually recorded is inside the range of the image indicated by the image signal input from the image sensor 6, the amount of image stabilization in the present invention can be changed depending on whether or not to crop.

Figure 22A:
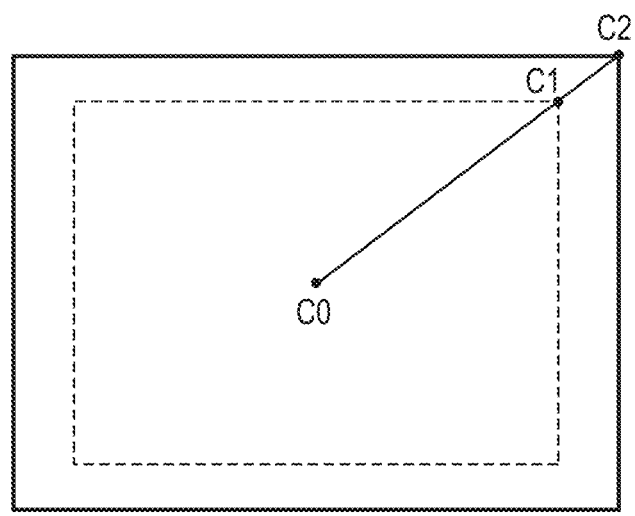
FIGS. 22A and 22B are diagrams for explaining a calculation method of the allowable drive amount of the image sensor according to the fifth embodiment.

FIG. 22A shows an example in which an image is cropped in the 80% area inside. An area indicated by a solid line is an image area when cropping is not performed, and an area indicated by a dotted line is an example of an image area when cropping is performed.

As the image is cropped at the inner 80%, when the distance between C2 and the image center C0 is D2, and the distance between C1 and C0 is D1, the following equation (7) holds.

$$D2 \times 0.8 = D1 \quad (7)$$

Figure 22B:
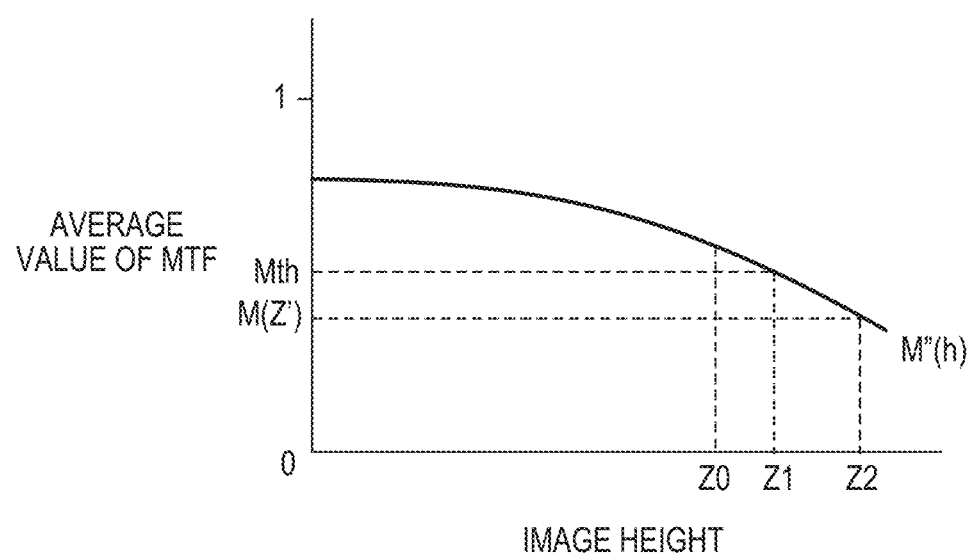

FIG. 22B is an example showing the relationship between the image height and the MTF evaluation value, and the maximum image height Z0 is equal to D2. With respect to the drive amount determination threshold Mth indicating an MTF average value that is acceptable from the viewpoint of image quality, in this example, when cropping is not performed, the image stabilization drive can be performed up to the image height Z1. On the other hand, when cropping is performed, the image to be recorded satisfies the determination threshold Mth if the image stabilization drive is performed up to the image height Z2 which is shown by the following equation (8).

$$Z2 = Z1 + (D2 - D1) \quad (8)$$

As described above, according to the present embodiment, it is possible to obtain an optimum image stabilizing effect by using an image area to be actually recorded.

Other Embodiments

Note that the present invention may be applied to a system composed of a plurality of devices or an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-214850, filed on Nov. 15, 2018, and No. 2019-186261, filed on Oct. 9, 2019 which are hereby incorporated by reference herein in their entirety.

What is claimed is:

1. An image stabilization apparatus comprising:
a calculator that
calculates a drive amount for correcting blur by moving a position of an image sensor, that photoelectrically converts light incident through an optical system and outputs an image signal, on a plane perpendicular to an optical axis of the optical system in accordance with a detected blur amount; and
calculates, for each of a plurality of states of the optical system and a plurality of states of an image capturing apparatus, an allowable drive amount of the image sensor corresponding to optical characteristics and a state of the optical system and a gain for correcting image quality deterioration due to the optical characteristics,
wherein the optical characteristics is at least one of peripheral darkening characteristic and an optical transfer function, and
wherein the calculator calculates the drive amount within the allowable drive amount.

2. The image stabilization apparatus according to claim 1 further comprising a memory that stores the allowable drive amount calculated by the calculator.

3. The image stabilization apparatus according to claim 1, wherein the calculator determines a smaller one of a first moving amount and a second moving amount as the allowable drive amount in accordance with the optical characteristics and state of the optical system in a case where the image quality deterioration is corrected within a range where noise is allowed,
the first moving amount, being of the image sensor from the optical axis, with which luminance at a maximum image height from the optical axis of the optical system at the periphery of a signal readout region of the image sensor is a predetermined first threshold, and
the second moving amount, being of the image sensor from the optical axis, with which a difference between luminance at the maximum image height and luminance at the minimum image height from the optical axis of the optical system in the signal readout region of the image sensor is predetermined second threshold values.

4. The image stabilization apparatus according to claim 1, wherein the states of the optical system include focal length, shooting distance, and state of aperture.

5. The image stabilization apparatus according to claim 1, wherein the calculator calculates the allowable drive amount of the image sensor further corresponding to distortion aberration in addition to the optical characteristics and state of the optical system, and the gain for correcting deterioration of image quality.

6. The image stabilization apparatus according to claim 1, wherein the calculator calculates the allowable drive amount of the image sensor further corresponding to ISO sensitivity in addition to the optical characteristics and state of the optical system, and the gain for correcting deterioration of image quality.

7. The image stabilization apparatus according to claim 6, wherein the state of the optical system includes a size of an area in the image sensor from which a signal is read out.

8. The image stabilization apparatus according to claim 1, wherein information on the optical characteristics of the optical system is obtained from a second memory.

9. The image stabilization apparatus according to claim 1, wherein information on the optical characteristics of the optical system is obtained from the optical system.

10. The image stabilization apparatus according to claim 1, wherein the optical characteristics is the peripheral darkening characteristic, and the optical characteristics of the optical system is estimated using a cosine fourth law.

11. The image stabilization apparatus according to claim 1, wherein the calculator calculates the allowable drive amount of the image sensor further corresponding to a size of an area from which an image to be recorded is read out of a whole area of the image sensor in addition to the optical characteristics and state of the optical system, and the gain for correcting deterioration of image quality.

12. The image stabilization apparatus according to claim 1, wherein the state of the optical system includes a pixel pitch.

13. An image capturing apparatus comprising:
    an image sensor;
    an image stabilization apparatus which comprises a calculator that
        calculates a drive amount for correcting blur by moving a position of the image sensor, that photoelectrically converts light incident through an optical system and outputs an image signal, on a plane perpendicular to an optical axis of the optical system in accordance with a detected blur amount,
        calculates, for each of a plurality of states of the optical system and a plurality of states of the image capturing apparatus, an allowable drive amount of the image sensor corresponding to optical characteristics and a state of the optical system and a gain for correcting image quality deterioration due to the optical characteristics; and
    an image stabilization mechanism that moves a position of the image sensor on a plane perpendicular to the optical axis of the optical system based on the drive amount calculated by the calculator,
    wherein the optical characteristics is at least one of peripheral darkening characteristic and an optical transfer function, and
    wherein the calculator calculates the drive amount within the allowable drive amount.

14. An image stabilization method comprising:
    calculating a drive amount for correcting blur by moving a position of an image sensor that photoelectrically converts light incident through an optical system and outputs an image signals on a plane perpendicular to an optical axis of the optical system in accordance with a detected blur amount; and
    calculating, for each of a plurality of states of the optical system and a plurality of states of an image capturing apparatus, an allowable drive amount of the image sensor corresponding to optical characteristics and a state of the optical system and a gain for correcting image quality deterioration due to the optical characteristics,
    wherein the optical characteristics is at least one of peripheral darkening characteristic and an optical transfer function, and
    wherein the drive amount is obtained within the allowable drive amount.

15. A non-transitory storage medium readable by a computer, the storage medium storing a program that is executable by the computer, wherein the program includes program code for causing the computer to function as an image stabilization apparatus comprising:
    a calculator that
        calculates a drive amount for correcting blur by moving a position of an image sensor, that photoelectrically converts light incident through an optical system and outputs an image signal, on a plane perpendicular to an optical axis of the optical system in accordance with a detected blur amount; and
        calculates, for each of a plurality of states of the optical system and a plurality of states of an image capturing apparatus, an allowable drive amount of the image sensor corresponding to optical characteristics and a state of the optical system and a gain for correcting image quality deterioration due to the optical characteristics,
    wherein the optical characteristics is at least one of peripheral darkening characteristic and an optical transfer function, and
    wherein the calculator calculates the drive amount within the allowable drive amount.

* * * * *